United States Patent
Satake et al.

(10) Patent No.: US 7,373,060 B2
(45) Date of Patent: May 13, 2008

(54) OPTICAL WAVEGUIDE USING POLYMER COMPOSED OF SILSESQUIOXANE DERIVATIVE

(75) Inventors: Hideshi Satake, Ichihara (JP); Nobuyuki Ootsuka, Ichihara (JP); Yasuhiro Yamamoto, Ichihara (JP); Kenya Ito, Ichihara (JP); Nobumasa Ootake, Ichihara (JP); Kazuhiro Yoshida, Ichihara (JP)

(73) Assignee: Chisso Corporation, Osaka (JP)

(*) Notice: Subject to any disclaimer, the term of this patent is extended or adjusted under 35 U.S.C. 154(b) by 0 days.

(21) Appl. No.: 11/363,177

(22) Filed: Feb. 28, 2006

(65) Prior Publication Data

US 2006/0204192 A1  Sep. 14, 2006

(30) Foreign Application Priority Data

Feb. 28, 2005  (JP) ............................. 2005-053459

(51) Int. Cl.
*G02B 6/02* (2006.01)
*C08G 77/04* (2006.01)

(52) U.S. Cl. .......................... 385/123; 385/141; 528/27
(58) Field of Classification Search ................ 385/123, 385/141, 142, 143, 144, 129, 130, 131; 528/9, 528/37, 38, 40, 25, 27; 556/450, 455, 460
See application file for complete search history.

(56) References Cited

U.S. PATENT DOCUMENTS

| | | | |
|---|---|---|---|
| 5,412,053 A | 5/1995 | Lichtenhan et al. | 528/9 |
| 5,484,867 A | 1/1996 | Lichtenhan et al. | 528/9 |
| 5,589,562 A | 12/1996 | Lichtenhan et al. | 528/9 |
| 6,144,795 A * | 11/2000 | Dawes et al. | 385/141 |
| 6,731,857 B2 * | 5/2004 | Shelnut et al. | 385/143 |
| 7,072,565 B2 * | 7/2006 | Shelnut et al. | 385/143 |
| 2002/0172492 A1 * | 11/2002 | Shelnut et al. | 385/143 |
| 2004/0110014 A1 * | 6/2004 | Chen et al. | 428/447 |
| 2006/0100410 A1 * | 5/2006 | Ootake et al. | 528/33 |
| 2006/0194068 A1 * | 8/2006 | Katoh et al. | 428/447 |
| 2006/0204192 A1 * | 9/2006 | Satake et al. | 385/123 |

FOREIGN PATENT DOCUMENTS

| | | | |
|---|---|---|---|
| JP | 3-43423 | 2/1991 | 385/141 X |
| JP | 4-157402 | 5/1992 | 385/141 X |
| JP | 9-325201 | 12/1997 | 385/141 X |
| JP | 10-36511 | 2/1998 | 385/141 X |
| JP | 10-197733 | 7/1998 | 385/141 X |
| JP | 2000-265065 | 9/2000 | 385/141 X |
| JP | 2002-69191 | 3/2002 | 385/141 X |
| JP | 2003-21735 | 1/2003 | 385/141 X |

OTHER PUBLICATIONS

Joseph D. Lichtenhan, "Polyhedral Oligomeric Silsesquioxanes: Building Blocks for Silsesquioxane-Based Polymers and Hybrid Materials", Comments Inorg. Chem., vol. 17, No. 2, pp. 115-130, 1995.
Joseph D. Lichtenhan et al., "Silsesquioxanes-Siloxane Copolymers from Polyhedral Silsesquioxanes", Macromolecules, 26, pp. 2141-2142, 1993.
Toshiaki Kobayashi et al., "Synthesis of Highly Heat-Resistance Soluble Polymers through Hydrosilylation Polymerization between Octakis(hydridosilsesquioxane) and Diynes", Chemistry Letters, pp. 763-764, 1998.
Chunxin Zhang et al., "Highly Porous Polyhedral Silsesquioxane Polymers. Synthesis and Characterization", J. Am. Chem. Soc., 120, pp. 8380-8391, 1998.
Fujigaya et al., "A Novel Low Dielectric Constant Polymer Material with Silsesquioxane Units in Main Chain", Polymer Preprints, Japan, vol. 50, No. 12, 2001.

* cited by examiner

*Primary Examiner*—Brian M. Healy
(74) *Attorney, Agent, or Firm*—Wenderoth, Lind & Ponack, L.L.P.

(57) ABSTRACT

An optical waveguide is produced by using a polymer obtained by using a silsesquioxane derivative represented by the formula (1-0).

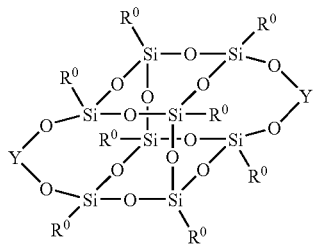

(1-0)

In the formula (1-0), $R^0$ independently represents
hydrogen,
alkyl having 1 to 40 carbon atoms in which optional hydrogen may be replaced by fluorine and optional —CH$_2$— may optionally be replaced by —O—, —CH═CH—, cycloalkylene, or cycloalkenylene,
aryl in which optional hydrogen may optionally be replaced by halogen, or with alkyl having 1 to 20 carbon atoms whereby optional hydrogen may be replaced by fluorine and optional —CH$_2$— may be replaced by —O—, —CH═CH—, cycloalkylene, or phenylene, or arylalkyl in which optional hydrogen in the aryl may be replaced by halogen or alkyl having 1 to 20 carbon atoms, and hydrogen in the alkylene of the arylalkyl may be replaced by fluorine, and optional —CH$_2$— in the alkylene of the arylalkyl may be replaced by —O—, —CH═CH—, or cycloalkylene, and Y is a group represented by the formula (a) or (b):

(a)

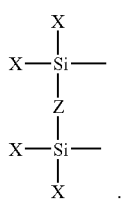

(b)

33 Claims, 1 Drawing Sheet

OPTICAL WAVEGUIDE USING POLYMER COMPOSED OF SILSESQUIOXANE DERIVATIVE

FIELD OF THE INVENTION

The present invention relates to an optical waveguide composed of a polymer obtained by using a silsesquioxane derivative having a cage-type silsesquioxane skeleton in its main chain. The optical waveguide of the present invention can be used in various optical components in the fields of optical communication and optical information processing.

DESCRIPTION OF THE RELATED ART

An inorganic material such as quartz glass has been widely used as a base material for an optical component or an optical waveguide fiber. This is because the material has optical properties, that is, a low optical transmission loss and a wide transmission bandwidth, and has high heat resistance, high moisture resistance, and high durability. However, organic materials for optical waveguide which are superior in processability and price to an inorganic material have been attracting attention in recent years.

However, conventional plastic optical waveguides have a problem in that it is inferior to an inorganic material in optical loss in a wide wavelength ranging from a visible region to a near infrared region and in heat resistance. To solve the problem, a heat-resistant polymer having a basic structure of polyorganosilsesquioxane has been developed as a material showing a low loss over a range from a visible region to a near infrared region and excellent in heat resistance and moisture resistance (JP03-43423A). However, the material has a problem in that solvent resistance is low and a crack is apt to be formed because of its amorphous silsesquioxane structure as a basic skeleton. Meanwhile, the material has been improved by means of a method comprising crosslinking with isocyanate and copolymerization with various siloxanes (JP04-157402A, JP09-325201A, JP10-36511A, and JP10-197733A). Furthermore, an optical waveguide has been produced by curing with a reactive oligomer of an amorphous silsesquioxane (JP-A-2003-21735).

However, incorporating a large amount of organic groups for a crosslinking or curing reaction reduces properties inherent to organosilsesquioxane such as an optical loss and heat resistance. Furthermore, the main problems lie in molecular weight controllability and productivity of amorphous silsesquioxane. In general, amorphous silsesquioxane is produced by means of organotrichlorosilane as a main component by a dehydration condensation reaction. Although the reaction system itself for amorphous silsesquioxane is simple, the reaction is hardly to be controlled, so it is difficult to produce a large amount of the polymer with a controlled molecular weight, and with good reproducibility and stability. The molecular weight is very important because it significantly affects the accuracy of a thickness upon production of an optical waveguide.

As described above, amorphous silsesquioxane is useful as an optical waveguide material, but it has the above-mentioned problems, so it is limited in terms of improvement of performance and productivity.

In addition to such amorphous silsesquioxane, research has been conducted on a polymer using silsesquioxane having a cage-type structure or a derivative thereof. The polymer is expected to be excellent in, for example, anti-weatherability, heat resistance, physical properties, and optical properties.

For example, Lichtenhan et al. disclosed a method of producing a copolymer in which silsesquioxane having a cage-type structure with a defect, that is, a so-called incomplete cage-type structure (a structure which is not of a complete octahedral shape and part of the structure is lost) is linked with siloxane (U.S. Pat. No. 5,412,053 and U.S. Pat. No. 5,589,562). The production method involves crosslinking polyhedral oligomeric silsesquioxane with a bifunctional silane, siloxane, or organometallic compound having amine or the like as a functional group. Lichtenhan et al. disclosed a method of producing a copolymer having, as its main chain, silsesquioxane with an incomplete cage-type structure linked with siloxane or the like, and a method of producing a copolymer by using silsesquioxane with a cage-type structure as a pendant copolymer component and methacrylic acid as a copolymer main chain component (Comments Inorg. Chem., 1995, 17, 115-130). Furthermore, Macromolecules, 1993, 26, 2141-2142 disclosed a method of producing a silsesquioxane-siloxane copolymer by allowing the —OH bound to Si at a corner of the incomplete cage-type structure of silsesquioxane to react with, for example, bis(dimethylamino)silane.

Meanwhile, Lichtenhan et al. disclosed a method of producing a copolymer comprising reacting silsesquioxane having a complete cage-type structure with a vinyl-containing compound (U.S. Pat. No. 5,484,867). Tanaka et al. reported that a copolymer can be obtained by subjecting hydrogenated octasilsesquioxane and phenylethylbenzene to hydrosilylation polymerization reaction (Chem., Lett., 1998, 763-764). Laine et al. reported that a gel-like copolymer can be obtained by subjecting a complete cage-type silsesquioxane compound having vinyl at plural corners of its cage-type structure and a hydrogenated incomplete cage-type silsesquioxane compound to hydrosilylation polymerization reaction (J. Am. Chem. Soc., 1998, 120, 8380-8391).

Zank et al. disclosed a method of producing a copolymer having hydrogenated octasilsesquioxane, which is soluble in an organic solvent. The method comprises reacting a hydrogenated octasilsesquioxane having a cage-type structure with a hydroxyl-containing compound or a vinyl-containing compound (JP2002-069191A and JP2000-265065A). In each of these methods, the obtained polymers have a structure in which silsesquioxane having a complete cage-type structure is grafted on a main chain, or serves as a crosslinking point. When silsesquioxane having a cage-type structure is grafted on a polymer chain, silsesquioxane suppresses a local molecular movement, and it exhibits an improving effect on a polymer, however, silsesquioxane does not contribute to a change in structure of the polymer chain. On the other hand, when silsesquioxane serves as a crosslinking point, a gel-like copolymer is produced, so a thin film having a uniform thickness cannot be obtained.

It has been extremely difficult to form a thin film from a polymer having, in its main chain, a cage-type silsesquioxane with controlled structure as described above. Therefore, no optical waveguide has been produced by using cage-type silsesquioxane.

SUMMARY OF THE INVENTION

An object of the present invention is to provide a material for an optical waveguide, which is excellent in molecular weight controllability, solvent resistance, heat resistance, moisture resistance, and shows a low optical transmission loss. In order to solve a problem of conventional amorphous silsesquioxane-based materials, the inventors of the present invention tried to make the molecular chain of the polymer having a cage-type silsesquioxane as rigid as possible, and to make the amount of an organic molecular chain entering the polymer reduced as less as possible.

The inventors of the present invention have made extensive studies in a view of producing an organic-inorganic hybrid material having a controlled cage-type structure by introducing a double-decker skeleton into any one of various organic polymer main chains. As a result, they succeeded in producing a polymer having the skeleton of a silsesquioxane derivative represented by the following formula (1-0) in its main chain. They found that the polymer is an extremely promising material as an optical waveguide material, because a colorless and transparent film produced from the polymer is excellent in film formability, transparency, heat resistance, solvent resistance, crack resistance, and adhesiveness, and thereby they completed the present invention.

It is an object to provide an optical waveguide composed of a polymer obtained by using a silsesquioxane derivative represented by the formula (1-0).

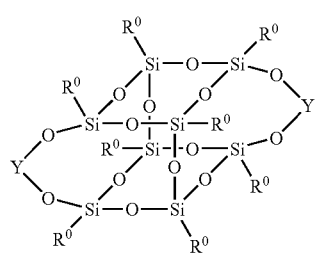

(1-0)

In the formula (1-0), $R^0$ independently represents:

hydrogen, alkyl having 1 to 40 carbon atoms in which optional hydrogen may be replaced by fluorine and optional —$CH_2$— may be replaced by —O—, —CH=CH—, cycloalkylene, or cycloalkenylene, aryl in which optional hydrogen may be replaced by halogen, or with alkyl having 1 to 20 carbon atoms whereby optional hydrogen may be replaced by fluorine and optional —$CH_2$— may be replaced by —O—, —CH=CH—, cycloalkylene, or phenylene, or arylalkyl in which optional hydrogen in the aryl may be replaced by halogen or alkyl having 1 to 20 carbon atoms, and optional hydrogen in the alkylene of the arylalkyl may be replaced by fluorine, and optional —$CH_2$— in the alkylene of the arylalkyl may be replaced by —O—, —CH=CH—, or cycloalkylene, and Y is a group represented by the formula (a) or (b).

(a)

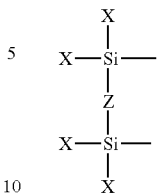

(b)

In each of the formulae (a) and (b), X independently represents a group selected from hydrogen bound to Si, chlorine bound to Si, a group defined in the same way as $R^0$, or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—, and at least one of X is a reactive group selected from the group, and Z in the formula (b) represents a single bond, —O—, or —$CH_2$—.

It is a further object to provide the optical waveguide as described above, which is composed of a polymer obtained by reacting a silsesquioxane derivative represented by the formula (1-0) with a compound having a group capable of reacting with the reactive group in the silsesquioxane derivative.

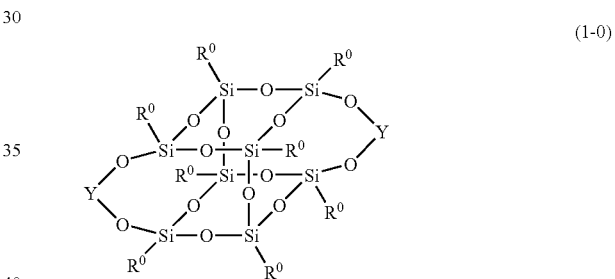

(1-0)

In the formula (1-0), $R^0$ independently represents hydrogen, alkyl having 1 to 40 carbon atoms in which optional hydrogen may be replaced by fluorine and optional —$CH_2$— may be replaced by —O—, —CH=CH—, cycloalkylene, or cycloalkenylene, aryl in which optional hydrogen may be replaced by halogen, or with alkyl having 1 to 20 carbon atoms whereby optional hydrogen may be replaced by fluorine and optional —$CH_2$— may be replaced by —O—, —CH=CH—, cycloalkylene, or phenylene, or arylalkyl in which optional hydrogen in the aryl may be replaced by halogen or alkyl having 1 to 20 carbon atoms, and optional hydrogen in the alkylene of the arylalkyl may be replaced by fluorine, and optional —$CH_2$— in the alkylene of the arylalkyl may be replaced by —O—, —CH=CH—, or cycloalkylene, and Y is a group represented by the formula (a) or (b).

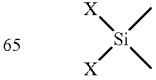

(a)

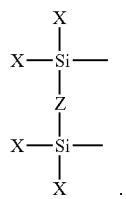

In each of the formulae (a) and (b), X independently represents a group selected from hydrogen bound to Si, chlorine bound to Si, a group defined in the same way as $R^0$, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and at least one of X is a reactive group selected from the group, and Z in the formula (b) represents a single bond, —O—, or —CH$_2$—.

It is a further object to provide the optical waveguide as described above, wherein the reactive group is hydrogen bound to Si, chlorine bound to Si, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$.

It is a further object to provide the optical waveguide as described above, wherein:

$R^0$ independently represents an alkyl having 1 to 8 carbon atoms in which optional hydrogen may be replaced by fluorine, and optional —CH$_2$— may be replaced by —O— or cycloalkylene, naphthyl, phenyl in which optional hydrogen may be replaced by halogen, methyl, or methoxy, or phenylalkyl in which optional hydrogen of the benzene ring may be replaced by halogen, alkyl having 1 to 4 carbon atoms or methoxy, and the alkylene in the phenylalkyl has 1 to 8 carbon atoms, and optional —CH$_2$— in the alkylene in the phenylalkyl may be replaced by —O— or cycloalkylene;

in each of the formulae (a) and (b), at least one of X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$, and the remaining X is a group defined in the same way as $R^0$; and Z in the formula (b) represents —O—.

It is a further object to provide the optical waveguide as described above, wherein:

all of the $R^0$ are the same group selected from alkyl having 1 to 8 carbon atoms, in which optional hydrogen may be replaced by fluorine, and optional —CH$_2$— may be replaced by —O— or a cycloalkylene, naphthyl, phenyl in which optional hydrogen may be replaced by halogen, methyl, or methoxy, and phenylalkyl in which optional hydrogen of the benzene ring may be replaced by halogen, alkyl having 1 to 4 carbon atoms or methoxy, and alkylene in the phenylalkyl has 1 to 8 carbon atoms, and optional —CH$_2$— in the alkylene in the phenylalkyl may be replaced by —O— or cycloalkylene;

in each of the formulae (a) and (b), one of the X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$, and the remaining X is a group defined in the same way as $R^0$; and Z in the formula (b) represents —O—.

It is a further object to provide the optical waveguide as described above, wherein:

all of the $R^0$ are the same group selected from unsubstituted phenyl, cyclopentyl, and cyclohexyl;

in each of the formulae (a) and (b), one of the X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$, and the remaining X is a group defined in the same way as $R^0$; and Z in the formula (b) represents —O—.

It is a further object to provide the optical waveguide as described above, which is composed of a polymer obtained by reacting a silsesquioxane derivative represented by the formula (1-1) with a compound having at least two Si—H groups.

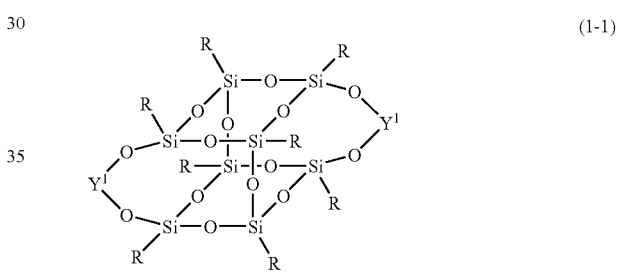

In the formula (1-1), R independently represents hydrogen, alkyl having 1 to 40 carbon atoms in which optional hydrogen may be replaced by fluorine and optional —CH$_2$— may be replaced by —O—, —CH═CH—, cycloalkylene, or cycloalkenylene, aryl in which optional hydrogen may be replaced by halogen, or with alkyl having 1 to 20 carbon atoms whereby optional hydrogen may be replaced by fluorine and optional —CH$_2$— may be replaced by —O—, —CH═CH—, cycloalkylene, or phenylene, or arylalkyl in which optional hydrogen in the aryl may be replaced by halogen or alkyl having 1 to 20 carbon atoms, and optional hydrogen in the alkylene of the arylalkyl may be replaced by fluorine, and optional —CH$_2$— in the alkylene of the arylalkyl may be replaced by —O—, —CH═CH—, or cycloalkylene, and $Y^1$ is a group represented by the formula (a-1) or (b-1).

-continued

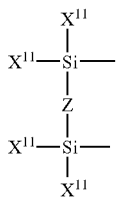
(b-1)

In each of the formulae (a-1) and (b-1), at least one of the $X^{11}$ is alkenyl-containing group, and the remaining $X^{11}$ independently represents a hydrogen, a group defined in the same way as R, or a group having anyone of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and Z in the formula (b-1) represents a single bond, —O—, or —CH$_2$—.

It is a further object to provide the optical waveguide as described above, which is composed of a polymer obtained by reacting a silsesquioxane derivative represented by the formula (1-1) with at least one of the compounds selected from the group consisting of a silsesquioxane derivative represented by the formula (1-2), a compound represented by the formula (2-1), a compound represented by the formula (3-1), a compound represented by the formula (4-1), a compound represented by the formula (5-1), and a compound represented by the formula (6-1).

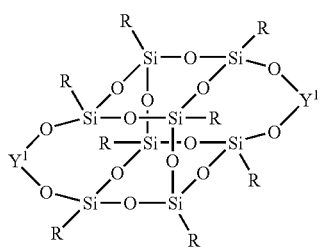
(1-1)

In the formula (1-1), R independently represents hydrogen, alkyl having 1 to 40 carbon atoms in which optional hydrogen may be replaced by fluorine and optional —CH$_2$— may be replaced by —O—, —CH=CH—, cycloalkylene, or cycloalkenylene, aryl in which optional hydrogen may be replaced by halogen, or with alkyl having 1 to 20 carbon atoms whereby optional hydrogen may be replaced by fluorine and optional —CH$_2$— may be replaced by —O—, —CH=CH—, cycloalkylene, or phenylene, or arylalkyl in which optional hydrogen in the aryl may be replaced by halogen or alkyl having 1 to 20 carbon atoms, and optional hydrogen in the alkylene of the arylalkyl may be replaced by fluorine, and optional —CH$_2$— in the alkylene of the arylalkyl may be replaced by —O—, —CH=CH—, or cycloalkylene, and $Y^1$ is a group represented by the formula (a-1) or (b-1).

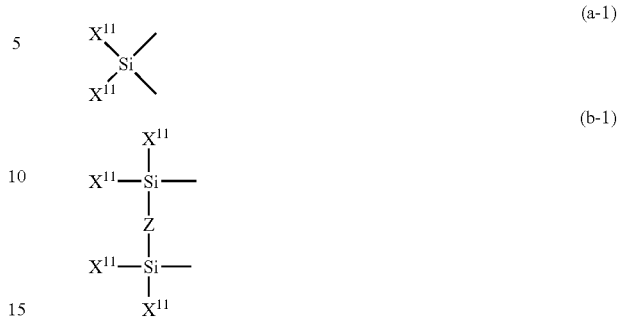

In each of the formulae (a-1) and (b-1), at least one of $X^{11}$ is an alkenyl-containing group, and the remaining $X^{11}$ independently represents hydrogen, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—.

Z in the formula (b-1) represents a single bond, —O—, or —CH$_2$—.

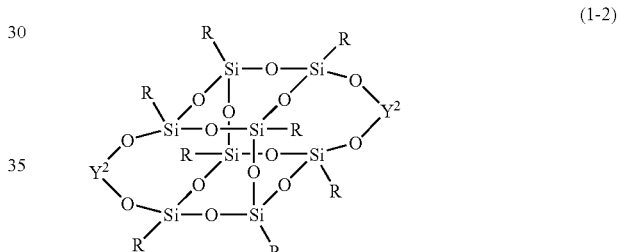
(1-2)

In the formula (1-2), R is a group defined in the same way as the R in the formula (1-1), and $Y^2$ is a group represented by the formula (a-2) or the formula (b-2).

(a-2)

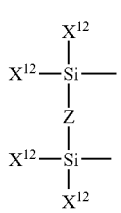
(b-2)

In each of the formulae (a-2) and (b-2), at least one of $X^{12}$ is hydrogen, and the remaining $X^{12}$ independently represents chlorine, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—.

Z in the formula (b-2) represents a single bond, —O—, or —CH$_2$—.

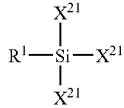
(2-1)

In the formula (2-1), R$^1$ is a group defined in the same way as R in the formula (1-1), at least two of X is hydrogen, and the remaining X$^{21}$ is R$^1$.

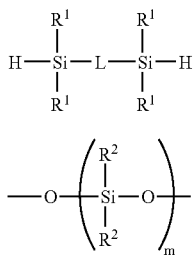
(3-1)

(c)

In the formula (3-1), R$^1$ is a group defined in the same way as R in the formula (1-1), and L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the formula (c). In the formula (c), R$^2$ is a group defined in the same way as R$^1$, and m represents an integer of 1 to 30.

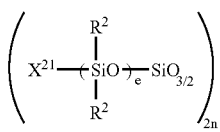
(4-1)

In the formula (4-1), R$^2$ is a group defined in the same way as R$^1$ in the formula (2-1), at least two of X$^{21}$ are hydrogen, the remaining X$^{21}$ is a group defined in the same group as R in the formula (1-1), e represents 0 or 1, and n represents an integer of 3 to 30.

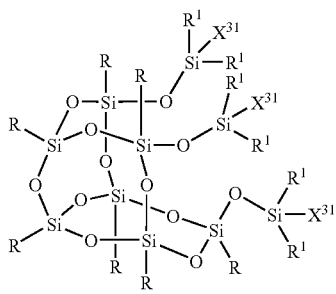
(5-1)

In the formula (5-1), each of R and R$^1$ is a group defined in the same way as R in the formula (1-1), at least two of X$^{31}$ are hydrogen, and the remaining X$^{31}$ is R$^1$.

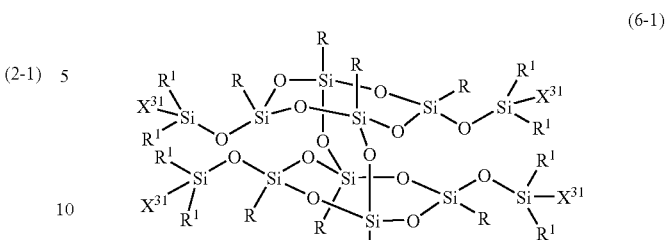
(6-1)

In the formula (6-1), each of R and R$^1$ represents a group defined in the same way as R in the formula (1-1), at least two of the X$^{31}$ are hydrogen, and the remaining X$^{31}$ is R$^1$.

It is a further object to provide the optical waveguide as described above, wherein:

in each of the formulae (a-1) and (b-1) in the formula (1-1), at least one of X$^{11}$ is an alkenyl-containing group, and the remaining X$^{11}$ is chlorine or a group defined in the same way as R in the formula (1-1); and in each of the formulae (a-2) and (b-2) in the formula (1-2), at least one of X$^{12}$ is hydrogen, and the remaining X$^{12}$ is chlorine or a group defined in the same way as R in the formula (1-1).

It is a further object to provide the optical waveguide as described above, wherein:

R in the formula (1-1) independently represents alkyl having 1 to 8 carbon atoms in which optional hydrogen may be replaced by fluorine and optional —CH$_2$— may be replaced by —O— or cycloalkylene, naphthyl, phenyl whose optional hydrogen may be replaced by halogen, methyl or methoxy, or phenylalkyl in which optional hydrogen of the benzene ring may be replaced by halogen, an alkyl group having 1 to 4 carbon atoms, or methoxy, and the alkylene in the phenylalkyl has 1 to 8 carbon atoms, and optional —CH$_2$— in the alkylene in the phenylalkyl may be replaced by —O— or cycloalkylene;

in each of the formulae (a-1) and (b-1) in the formula (1-1), at least one of the X$^{11}$ is an alkenyl-containing group, and the remaining X$^{11}$ is a group defined in the same way as R in the formula (1-1);

in each of the formulae (a-2) and (b-2) in the formula (1-2), at least one of X$^{12}$ is hydrogen, and the remaining X$^{21}$ is a group defined in the same way as R in the formula (1-2); and Z in each of the formulae (b-1) and (b-2) represents —O—.

It is a further object to provide the optical waveguide as described above, wherein:

all of the R in the formula (1-1) are the same group selected from alkyl having 1 to 8 carbon atoms in which optional hydrogen may be replaced by fluorine and optional —CH$_2$— may be replaced by —O— or cycloalkylene, naphthyl, phenyl whose optional hydrogen may be replaced by halogen, methyl, or methoxy, and phenylalkyl in which optional hydrogen of the benzene ring may be replaced by halogen, alkyl having 1 to 4 carbon atoms, or methoxy, and alkylene in the phenylalkyl has 1 to 8 carbon atoms, and optional —CH$_2$— in the alkylene in the phenylalkyl may be replaced by —O— or cycloalkylene;

in each of the formulae (a-1) and (b-1) in the formula (1-1), one of the $X^{11}$ is alkenyl-containing group, and the remaining $X^{11}$ is a group defined in the same way as R in the formula (1-1);

in each of the formulae (a-2) and (b-2) in the formula (1-2), one of the $X^{12}$ is hydrogen, and the remaining $X^{12}$ is a group defined in the same way as R in the formula (1-2); and Z in each of the formulae (b-1) and (b-2) represents —O—.

It is a further object to provide the optical waveguide as described above, wherein:

all of the R in the formula (1-1) are the same group selected from unsubstituted phenyl, cyclopentyl, and cyclohexyl;

in each of the formulae (a-1) and (b-1) in the formula (1-1), at least one of $X^{11}$ is an alkenyl-containing group, and the remaining $X^{11}$ is an alkyl having 1 to 8 carbon atoms, or unsubstituted phenyl, cyclopentyl, or cyclohexyl;

in each of the formulae (a-2) and (b-2) in the formula (1-2), at least one of the $X^{12}$ is hydrogen, and the remaining $X^{12}$ is an alkyl having 1 to 8 carbon atoms, or unsubstituted phenyl, cyclopentyl, or cyclohexyl;

Z in each of the formulae (b-1) and (b-2) represents —O—;

in each of the formulae (2-1), (3-1), (5-1), and (6-1), $R^1$ is an alkyl having 1 to 8 carbon atoms, or unsubstituted phenyl, cyclopentyl, or cyclohexyl;

in the formula (2-1), at least two of the $X^{21}$ are hydrogen, and the remaining $X^{21}$ is $R^1$; and in the formula (4-1), at least two of the $X^{21}$ is hydrogen, and the remaining $X^{21}$ is a group defined in the same way as R in the formula (1-1).

It is a further object to provide the optical waveguide as described above, wherein:

all of the R in the formula (1-1) are the same group selected from unsubstituted phenyl, cyclopentyl, and cyclohexyl;

in each of the formulae (a-1) and (b-1) in the formula (1-1), at least one of $X^{11}$ is vinyl, aryl, or styryl, and the remaining $X^{11}$ is alkyl having 1 to 8 carbon atoms, or unsubstituted phenyl, cyclopentyl, or cyclohexyl;

in each of the formulae (a-2) and (b-2) in the formula (1-2), at least one of $X^{12}$ is hydrogen, and the remaining $X^{12}$ is alkyl having 1 to 8 carbon atoms, or unsubstituted phenyl, cyclopentyl, or cyclohexyl;

Z in each of the formulae (b-1) and (b-2) in the formulae (1-1) and (1-2) represents —O—;

in each of the formulae (2-1), (3-1), (5-1), and (6-1), $R^1$ is alkyl having 1 to 8 carbon atoms, or unsubstituted phenyl, cyclopentyl, or cyclohexyl;

in the formula (2-1), at least two of the $X^{21}$ is hydrogen, and the remaining $X^{21}$ is $R^1$; and in the formula (4-1), at least two of the $X^{21}$ is hydrogen, and the remaining $X^{21}$ is a group defined in the same way as R in the formula (1-1).

It is a further object to provide the optical waveguide as described above, wherein:

all of the R in the formula (1-1) are unsubstituted phenyl;

in each of the formulae (a-1) and (b-1) in the formula (1-1), at least one of the $X^{11}$ is vinyl, aryl, or styryl, and the remaining $X^{11}$ is alkyl having 1 to 4 carbon atoms or unsubstituted phenyl;

in each of the formulae (a-2) and (b-2) in the formula (1-2), at least one of $X^{12}$ is hydrogen, and the remaining $X^{12}$ is alkyl having 1 to 4 carbon atoms or unsubstituted phenyl;

in each of the formulae (2-1), (3-1), (5-1), and (6-1), $R^1$ is an alkyl having 1 to 4 carbon atoms or unsubstituted phenyl;

in the formula (2-1), at least two of the $X^{21}$ is hydrogen, and the remaining $X^{21}$ is $R^1$; and in the formula (4-1), at least two of the $X^{21}$ is hydrogen, and the remaining $X^{21}$ is a group defined in the same way as R in the formula (1-1).

It is a further object to provide the optical waveguide as described above, composed of a polymer obtained by reacting a silsesquioxane derivative represented by the formula (1-2) with a compound having at least two alkenyl-containing groups or a compound having a carbon-carbon triple bond.

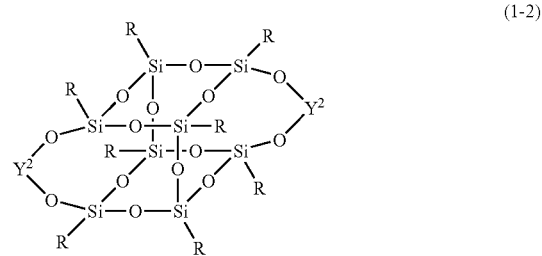

(1-2)

In the formula (1-2), R independently represents
hydrogen,
alkyl having 1 to 40 carbon atoms in which optional hydrogen may be replaced by fluorine and optional —CH$_2$— may be replaced by —O—, —CH=CH—, cycloalkylene, or cycloalkenylene,
aryl in which optional hydrogen may be replaced by halogen, or with alkyl having 1 to 20 carbon atoms whereby optional hydrogen may be replaced by fluorine and optional —CH$_2$— may be replaced by —O—, —CH=CH—, cycloalkylene, or phenylene, or
arylalkyl in which optional hydrogen in the aryl may be replaced by halogen or alkyl having 1 to 20 carbon atoms, and optional hydrogen in the alkylene of the arylalkyl may be replaced by fluorine, and optional —CH$_2$— in the alkylene of the arylalkyl may be replaced by —O—, —CH=CH—, or cycloalkylene, and
$Y^2$ is a group represented by the formula (a-2) or (b-2).

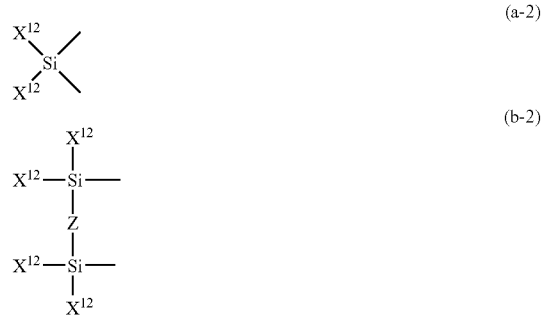

In each of the formulae (a-2) and (b-2), at least one of the $X^{12}$ is hydrogen, and the remaining $X^{12}$ independently represents hydrogen, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—.

Z in the formula (b-2) represents a single bond, —O—, or —CH$_2$—.

It is a further object to provide the optical waveguide as described above, composed of a polymer obtained by reacting a silsesquioxane derivative represented by the formula (1-2) with at least one of the compounds selected from the group consisting of a compound represented by the formula (2-2), a compound represented by the formula (3-2), a compound represented by the formula (4-2), a compound represented by the formula (5-2), a compound represented by the formula (6-2), a compound represented by the formula (d-1), a compound represented by the formula (d-2), a compound represented by the formula (d-3), and a compound represented by the formula (d-4).

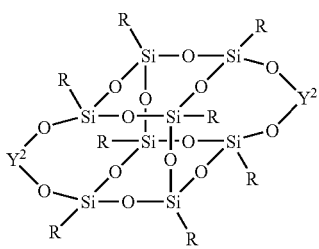
(1-2)

In the formula (1-2), R independently represents hydrogen, alkyl having 1 to 40 carbon atoms in which optional hydrogen may be replaced by fluorine and optional —CH$_2$— may be replaced by —O—, —CH=CH—, cycloalkylene, or cycloalkenylene, aryl in which optional hydrogen may be replaced by halogen, or with alkyl having 1 to 20 carbon atoms whereby optional hydrogen may be replaced by fluorine and optional —CH$_2$— may be replaced by —O—, —CH=CH—, cycloalkylene, or phenylene, or arylalkyl in which optional hydrogen in the aryl may be replaced by halogen or alkyl having 1 to 20 carbon atoms, and optional hydrogen in the alkylene of the arylalkyl may be replaced by fluorine, and optional —CH$_2$— in the alkylene of the arylalkyl may be replaced by —O—, —CH=CH—, or cycloalkylene, and $Y^2$ is a group represented by the formula (a-2) or (b-2).

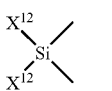
(a-2)

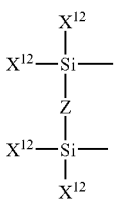
(b-2)

In each of the formulae (a-2) and (b-2), at least one of $X^{12}$ is hydrogen, and the remaining $X^{12}$ independently represents chlorine, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and Z in the formula (b-2) represents a single bond, —O—, or —CH$_2$—.

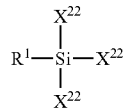
(2-2)

In the formula (2-2), $R^1$ is a group defined in the same way as R in the formula (1-2), at least two $X^{22}$ are an alkenyl-containing group or a group having a carbon-carbon triple bond, and the remaining $X^{22}$ is $R^1$.

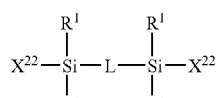
(3-2)

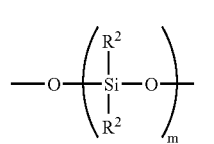
(c)

In the formula (3-2), $R^1$ is a group defined in the same way as R in the formula (1-2), $X^{22}$ is alykenyl-containing group, and L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the formula (c).

In the formula (c), $R^2$ is a group defined in the same way as $R^1$, and m represents an integer of 1 to 30.

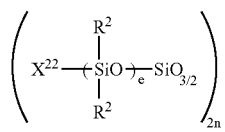
(4-2)

In the formula (4-2), $R^2$ is a group defined in the same way as $R^1$ in the formula (2-2), at least two of the $X^{22}$ is an alkenyl-containing group, the remaining $X^{22}$ is a group defined in the same way as R in the formula (1-2), e represents 0 or 1, and n represents an integer of 3 to 30.

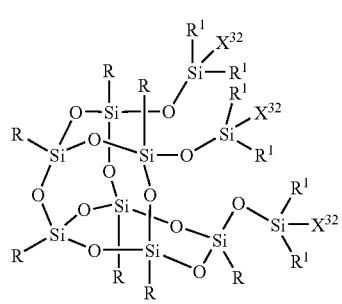
(5-2)

In the formula (5-2), each of R and $R^1$ is a group defined in the same way as R in the formula (1-2), at least two of the $X^{32}$ is an alkenyl-containing group, and the remaining $X^{32}$ is $R^1$.

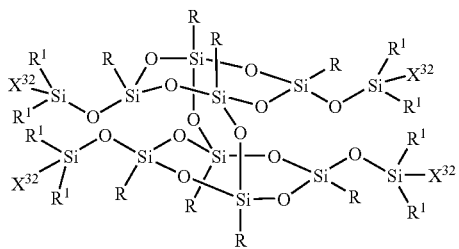 (6-2)

In the formula (6-2), each of R and $R^1$ is a group defined in the same way as R in the formula (1-2), at least two of the $X^{32}$ is an alkenyl-containing group, and the remaining $X^{32}$ is $R^1$.

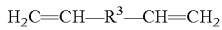 (d-1)

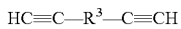 (d-2)

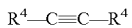 (d-3)

 (d-4)

In each of the formulae (d-1), (d-2), (d-3) and (d-4), $R^3$ represents alkyl having 1 to 40 carbon atoms in which optional —$CH_2$— may be replaced by —O— or —COO—, or phenyl whose optional hydrogen may be replaced by halogen or an alkyl having 1 to 4 carbon atoms, $R^4$ represents an alkyl having 1 to 8 carbon atoms in which optional —$CH_2$— may be replaced by —O— or —COO—., or phenyl whose optional hydrogen may be replaced by halogen or an alkyl having 1 to 4 carbon atoms.

It is a further object to provide the optical waveguide as described above, wherein:

in each of the formulae (a-2) and (b-2) in the formula (1-2), at least one of $X^{12}$ is hydrogen, and the remaining $X^{12}$ is chlorine or the same group as R in the formula (1-2).

It is a further object to provide the optical waveguide as described above, wherein:

R in the formula (1-2) independently represents alkyl having 1 to 8 carbon atoms in which optional hydrogen may be replaced by fluorine, and optional —$CH_2$— may be replaced by —O— or cycloalkylene, naphthyl, phenyl whose optional hydrogen may be replaced by halogen, methyl, or methoxy, or phenylalkyl in which optional hydrogen of the benzene ring may be replaced by halogen, alkyl having 1 to 4 carbon atoms, or methoxy, and alkylene in the phenylalkyl has 1 to 8 carbon atoms, and optional —$CH_2$— in the alkylene in the phenylalkyl may be replaced by —O— or cycloalkylene;

in each of the formulae (a-2) and (b-2), at least one of $X^{12}$ is hydrogen, and the remaining $X^{12}$ is a group defined in the same way as R in the formula (1-2); and Z in the formula (b-2) represents —O—.

It is a further object to provide the optical waveguide as described above, wherein:

all of the R in the formula (1-2) are the same group selected from alkyl having 1 to 8 carbon atoms in which optional hydrogen may be replaced by fluorine, and optional —$CH_2$— may be replaced by —O— or cycloalkylene, naphthyl, phenyl whose optional hydrogen may be replaced by halogen, methyl, or methoxy, or phenylalkyl in which optional hydrogen of the benzene ring may be replaced by halogen, an alkyl group having 1 to 4 carbon atoms, or methoxy, and alkylene in the phenylalkyl has 1 to 8 carbon atoms, and optional —$CH_2$— in the alkylene in the phenylalkyl may be replaced by —O— or a cycloalkylene;

in each of the formulae (a-2) and (b-2), at least one of $X^{12}$ is hydrogen, and the remaining $X^{12}$ is a group defined in the same way as R in the formula (1-2); and Z in the formula (b-2) represents —O—.

It is a further object to provide the optical waveguide as described above, wherein:

all of the R in the formula (1-2) are the same group selected from unsubstituted phenyl, cyclopentyl, and cyclohexyl;

in each of the formulae (a-2) and (b-2), at least one of $X^{12}$ is hydrogen, and the remaining $X^{12}$ is an alkyl having 1 to 8 carbon atoms, or unsubstituted phenyl, cyclopentyl, or cyclohexyl;

Z in the formula (b-2) represents —O—; and in each of the formulae (2-2), (3-2), (5-2), and (6-2), $R^1$ is an alkyl having 1 to 8 carbon atoms, or unsubstituted phenyl, cyclopentyl, or cyclohexyl.

It is a further object to provide the optical waveguide as described above, wherein:

all of the R in the formula (1-2) are the same group selected from unsubstituted phenyl, cyclopentyl, and cyclohexyl;

in each of the formulae (a-2) and (b-2), at least one of $X^{12}$ is hydrogen, and the remaining $X^{12}$ is an alkyl having 1 to 8 carbon atoms, or unsubstituted phenyl, cyclopentyl, or cyclohexyl;

Z in the formula (b-2) represents —O—;

in each of the formulae (2-2), (3-2), (5-2), and (6-2), $R^1$ is an alkyl having 1 to 8 carbon atoms, or unsubstituted phenyl, cyclopentyl, or cyclohexyl;

in the formula (2-2), at least two $X^{22}$ are vinyl, aryl or styryl, and the remaining $X^{22}$ is $R^1$;

in the formula (3-2), $X^{22}$ is vinyl, aryl or styryl;

in the formula (4-2), at least two $X^{22}$ are vinyl, aryl or styryl, and the remaining $X^{22}$ is a group defined in the same way as R in the formula (1-2); and in each of the formulae (5-2) and (6-2), at least two of the $X^{32}$ are vinyl, aryl or styryl, and the remaining $X^{32}$ is $R^1$.

It is a further object to provide the optical waveguide as described above, wherein:

all of the R in the formula (1-2) are unsubstituted phenyl;

in each of the formulae (a-2) and (b-2), at least one of $X^{12}$ is hydrogen, and the remaining $X^{12}$ is an alkyl having 1 to 4 carbon atoms or unsubstituted phenyl;

Z in the formula (b-2) represents —O—;

in each of the formulae (2-2), (3-2), (5-2), and (6-2), $R^1$ is an alkyl having 1 to 4 carbon atoms or unsubstituted phenyl;

in the formula (2-2), at least two $X^{22}$ are a vinyl, allyl, or styryl, and the remaining $X^{22}$ is $R^1$;

in the formula (3-2), $X^{22}$ is a vinyl, allyl, or styryl;

in the formula (4-2), at least two $X^{22}$ are a vinyl, allyl, or styryl, and the remaining $X^{22}$ is an unsubstituted phenyl; and in each of the formulae (5-2) and (6-2), at least two of the $X^{32}$ are a vinyl, allyl, or styryl, and the remaining $X^{32}$ is $R^1$.

It is a further object to provide the optical waveguide as described above, which is composed of a polymer obtained by reacting a silsesquioxane derivative represented by the formula (1-4) with a compound having at least two groups capable of reacting with the reactive group in the silsesquioxane derivative.

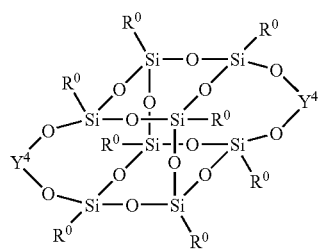

(1-4)

In the formula (1-4), $R^0$ independently represents
hydrogen,
alkyl having 1 to 40 carbon atoms in which optional hydrogen may be replaced by fluorine and optional —$CH_2$— may be replaced by —O—, —CH=CH—, cycloalkylene, or cycloalkenylene,
aryl in which optional hydrogen may be replaced by halogen, or with alkyl having 1 to 20 carbon atoms whereby optional hydrogen may be replaced by fluorine and optional —$CH_2$— may be replaced by —O—, —CH=CH—, cycloalkylene, or phenylene, or
arylalkyl in which optional hydrogen in the aryl may be replaced by halogen or alkyl having 1 to 20 carbon atoms, and optional hydrogen in the alkylene of the arylalkyl may be replaced by fluorine, and optional —$CH_2$— in the alkylene of the arylalkyl may be replaced by —O—, —CH=CH—, or cycloalkylene, and $Y^4$ is a group represented by the formula (a-4) or (b-4).

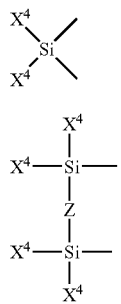

(a-4)

(b-4)

In each of the formulae (a-4) and (b-4), $X^4$ independently represents a chlorine, a group defined in the way as $R^0$, or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—, and at least one of the $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and Z in the formula (b-4) represents a single bond, —O—, or —$CH_2$—.

It is a further object to provide the optical waveguide as described above, wherein:
in the formula (1-4), $R^0$ independently represents alkyl having 1 to 8 carbon atoms in which optional hydrogen may be replaced by fluorine, and optional —$CH_2$— may be replaced by —O— or a cycloalkylene,
naphthyl,
phenyl whose optional hydrogen may be replaced by halogen, methyl, or methoxy, or
phenylalkyl in which optional hydrogen of the benzene ring may be replaced by halogen, an alkyl having 1 to 4 carbon atoms, or methoxy, and alkylene in the phenylalkyl has 1 to 8 carbon atoms, and optional —$CH_2$— in the alkylene in the phenylalkyl may be replaced by —O— or cycloalkylene;
in each of the formulae (a-4) and (b-4), at least one of $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and
Z in the formula (b-4) represents —O—.

It is a further object to provide the optical waveguide as described above, wherein:
in the formula (1-4), all of the $R^0$ are the same group selected from
alkyl having 1 to 8 carbon atoms in which optional hydrogen may be replaced by fluorine, and optional —$CH_2$— may be replaced by —O— or cycloalkylene,
naphthyl,
phenyl whose optional hydrogen may be replaced by halogen, methyl, or methoxy, and
phenylalkyl in which optional hydrogen of the benzene ring may be replaced by halogen, an alkyl having 1 to 4 carbon atoms or methoxy, and alkylene in the phenylalkyl has 1 to 8 carbon atoms, and optional —$CH_2$— in the alkylene in the phenylalkyl may be replaced by —O— or cycloalkylene;
in each of the formulae (a-4) and (b-4), at least one of $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and
Z in the formula (b-4) represents —O—.

It is a further object to provide the optical waveguide as described above, wherein:
all of the $R^0$ are the same group selected from unsubstituted phenyl, cyclopentyl, and cyclohexyl;
in each of the formulae (a-4) and (b-4), one of $X^4$ is a group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and
Z in the formula (b-4) represents —O—.

It is a further object to provide the optical waveguide as described above, which is composed of a polymer obtained by reacting a silsesquioxane derivative represented by the formula (1-4) in which $Y^4$ is a group represented by the formula (a-2) with a compound represented by the formula (8-2).

(a-2)

$X^{12}$ in the formula (a-2) is an alkyl having 1 to 4 carbon atoms or unsubstituted phenyl.

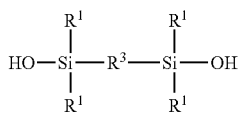
(8-2)

In the formula (8-2), $R^1$ is an alkyl having 1 to 4 carbon atoms or unsubstituted phenyl, and $R^3$ is a phenyl, naphthalene, or anthracene.

It is a further object to provide the optical waveguide as described above, which is composed of a polymer obtained by reacting a silsesquioxane derivative represented by the formula (1-4) in which $Y^4$ is a group represented by the formula (a-3) with carboxylic acid or an epoxy.

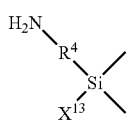
(a-3)

In the formula (a-3), $R^4$ is a divalent organic group having 1 to 20 carbon atoms, and $X^{13}$ is an alkyl having 1 to 4 carbon atoms or an unsubstituted phenyl.

It is a further object to provide the optical waveguide as described above, which is composed of a polymer obtained by reacting a silsesquioxane derivative represented by the formula (1-4) in which $Y^4$ is a group represented by the formula (a-4) with diamine.

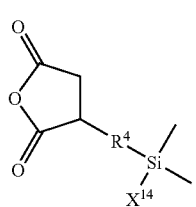
(a-4)

In the formula (a-4), $R^4$ is a divalent organic group having 1 to 20 carbon atoms, and $X^{14}$ is an alkyl having 1 to 4 carbon atoms or unsubstituted phenyl.

It is a further object to provide the optical waveguide as described above, which is composed of a polymer obtained by reacting a silsesquioxane derivative represented by the formula (1-4) in which $Y^4$ is a group represented by the formula (a-3) with a silsesquioxane derivative represented by the formula (1-4) in which $Y^4$ is a group represented by the formula (a-4).

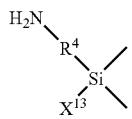
(a-3)

In the formula (a-3), $R^4$ is a divalent organic group having 1 to 20 carbon atoms, and $X^{13}$ is an alkyl having 1 to 4 carbon atoms or unsubstituted phenyl.

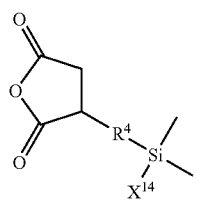
(a-4)

In the formula (a-4), $R^4$ is a divalent organic group having 1 to 20 carbon atoms, and $X^{14}$ is an alkyl having 1 to 4 carbon atoms or unsubstituted phenyl.

It is a further object to provide the optical waveguide as described above, which is composed of a polymer obtained by reacting a silsesquioxane derivative represented by the formula (1-4) in which $Y^4$ is a group represented by the formula (a-4) with a silsesquioxane derivative represented by the formula (1-4) in which $Y^4$ is a group represented by the formula (a-5).

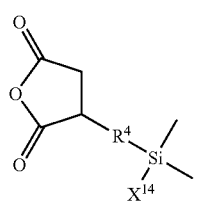
(a-4)

In the formula (a-4), $R^4$ is a divalent organic group having 1 to 20 carbon atoms, and $X^{14}$ is an alkyl having 1 to 4 carbon atoms or unsubstituted phenyl.

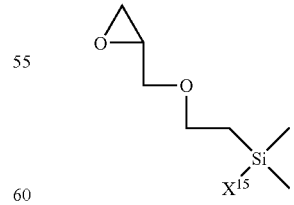
(a-5)

$X^{15}$ in the formula (a-5) is an alkyl having 1 to 4 carbon atoms or unsubstituted phenyl.

It is a further object to provide the optical waveguide as described above, which is composed of a polymer obtained by reacting a silsesquioxane derivative represented by the formula (1-4) in which $Y^4$ is a group represented by the formula (a-4) with a compound represented by the formula (9-1).

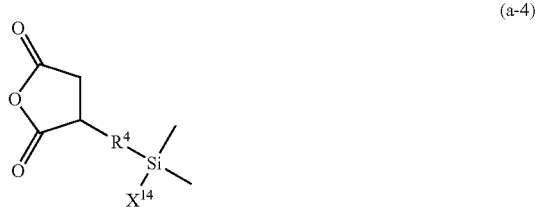

(a-4)

In the formula (a-4), $R^4$ is a divalent organic group having 1 to 20 carbon atoms, and $X^{14}$ is an alkyl having 1 to 4 carbon atoms or unsubstituted phenyl.

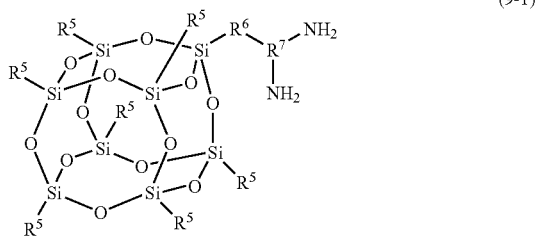

(9-1)

In the formula (9-1), all of the $R^5$ are alkyl having 1 to 20 carbon atoms, alkenyl having 2 to 20 carbon atoms, or aryl having 6 to 20 carbon atoms, whereby optional —$CH_2$— may be replaced by —O—, and optional hydrogen may be replaced by halogen.

$R^6$ is a single bond or a divalent organic group having 1 to 15 carbon atoms, and $R^7$ is a trivalent organic group having 1 to 15 carbon atoms.

A preferable method for obtaining the polymer is a method comprising utilizing a hydrosilylation reaction. The following two methods are preferable methods for obtaining the polymer by hydrosilylation reaction. A first example is a method comprising reacting the compound (1-0) having at least two alkenyl-containing groups with a compound having at least two Si—H groups in the presence of a hydrosilylation catalyst. A second example is a method comprising reacting the compound (1-0) having at least two Si—H groups with a compound having at least two alkenyl-containing groups or with a compound having a carbon-carbon triple bond in the presence of a hydrosilylation catalyst.

The terms as used herein are defined as follows. Each of an alkyl and an alkylene may be a linear group or a branched group. This holds true for the case where optional hydrogen in each of those groups is replaced by halogen, a cyclic group, or the like, and for the case where optional —$CH_2$— in each of them is replaced by —O—, —CH=CH—, cycloalkylene, cycloalkenylene, phenylene, or the like. The term "optional" as used herein means that not only a position but also a number is optional. When multiple groups are replaced by separate groups, the groups by which the multiple groups are replaced may be different from each other. For example, the case where "optional —$CH_2$— in an alkyl may be replaced by —O— or —CH=CH—" means that the alkyl may be alkoxyalkenyl or alkenyloxyalkyl. In addition, any one of alkoxy, alkenylene, alkenyl, and alkylene in those groups may be a linear group or a branched group. However, the description "optional —$CH_2$— may be replaced by —O—" in the present invention does not mean that each of multiple consecutive —$CH_2$— is replaced by —O—. Examples of a halogen in the present invention include fluorine, chlorine, and bromine. The term "alkenyl-containing group" is defined as a generic name for alkenyl and a group having alkenyl.

DETAILED DESCRIPTION OF EXEMPLARY EMBODIMENTS

Figure 1:
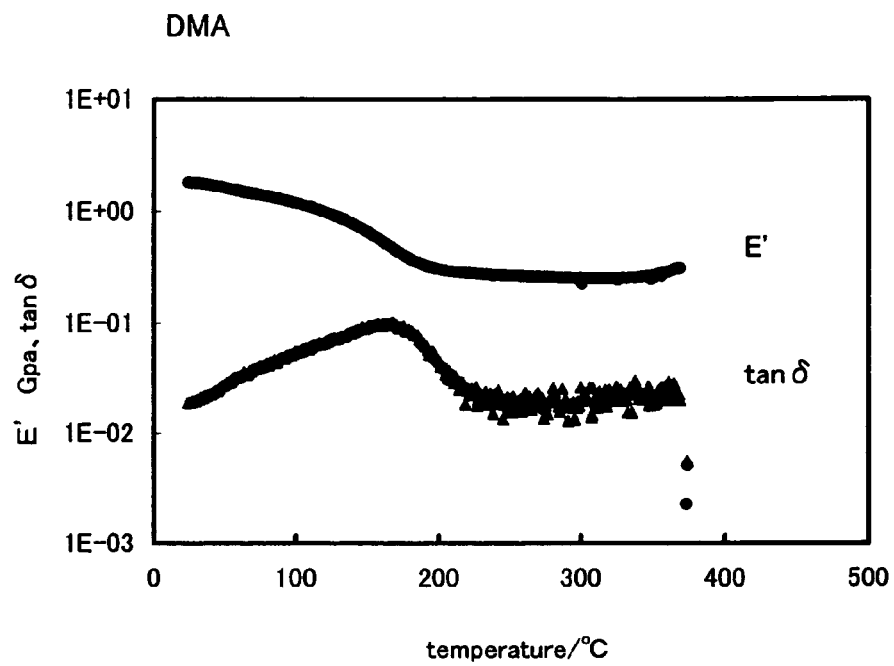
FIG. 1 shows showing the results of dynamic mechanical analysis (DMA) of the polymer.

Hereinafter, "silsesquioxane" may be represented as "PSQ". Therefore, a "silsesquioxane derivative" may be represented as "PSQ derivative". PSQ derivative represented by the formula (1-0) may be represented as the compound (1-0). A compound represented by the formula (2-1) may be represented as the compound (2-1). PSQ derivatives and compounds represented by other formulae may be represented in the same manner. Hereinafter, the present invention will be described in more detail.

The optical waveguide of the present invention is composed of a polymer obtained by using the compound (1-0).

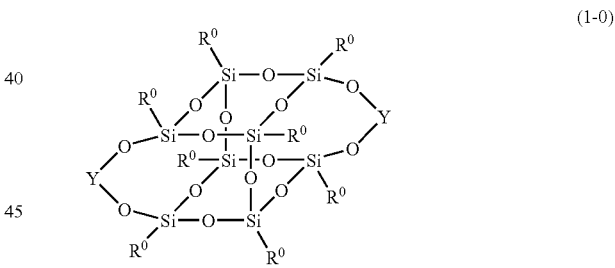

(1-0)

In the formula (1-0), $R^0$ independently represents hydrogen, alkyl having 1 to 40 carbon atoms, aryl whose optional hydrogen may be replaced by halogen or alkyl having 1 to 20 carbon atoms, or arylalkyl in which optional hydrogen in the aryl may be replaced by halogen or alkyl having 1 to 20 carbon atoms. This optional hydrogen in the alkyl having 1 to 40 carbon atoms may be replaced by fluorine, and optional —$CH_2$— in the alkyl may be replaced by —O—, —CH=CH—, cylcloalkylene, or cycloalkenylene. Optional hydrogen in the alkyl having 1 to 20 carbon atoms as the substituent in the aryl may be replaced by fluorine, and optional —$CH_2$— in the alkyl may be replaced by —O—, —CH=CH—, cylcloalkylene, or phenylene. Optional hydrogen in the alkylene of the arylalkyl may be replaced by fluorine, and optional —$CH_2$— in the alkylene of the arylalkyl may be replaced by —O—, —CH=CH—, or cylcloalkylene.

Y is a group represented by the formula (a) or (b).

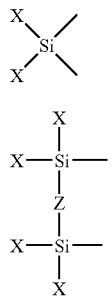

(a)

(b)

In each of the formulae (a) and (b), X independently represents hydrogen, chlorine, a group defined in the same way as $R^0$, or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and at least one of X represents a reactive group selected from those substituents. Z in the formula (b) is a single bond, —O—, or —CH$_2$—, and Z is preferably —O—.

Examples of the reactive group preferable for polymerization reaction include: hydrogen; chlorine; or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$. Examples of X which is not a reactive group include: a group defined in the same way as $R^0$; and a group having —CN or —O—, and a group defined in the same way as $R^0$ is preferable as X which is not a reactive group. Si—Cl may be introduced for the purposes of performing polymerization, or performing graft processing after production of a polymer. When the compound (1-0) has at least two reactive groups, it is preferable to react it with a compound having at least two groups capable of reacting with the reactive groups to produce a polymer.

In the formula (1-0), it is preferable that all of the $R^0$ is the same kind of group, although $R^0$ may be two or more kinds of groups. Examples of the case where $R^0$ is two or more kinds of groups include: the case where $R^0$ is two or more kinds of alkyl; the case where $R^0$ is two or more kinds of aryl; the case where $R^0$ is two or more kinds of aralkyl; the case where at least one of $R^0$ is aryl and the other is hydrogen; the case where at least one of $R^0$ is alkyl and at least one of $R^0$ is aryl; the case where at least one of $R^0$ is alkyl and at least one of $R^0$ is aralkyl; and the case where at least one of $R^0$ is aryl and at least one of $R^0$ is aralkyl. However, another combination may also be available.

When any one of $R^0$ is an alkyl, the alkyl has 1 to 40, preferably 1 to 20, or more preferably 1 to 8 carbon atoms. In addition, optional hydrogen in the alkyl may be replaced by fluorine, and optional —CH$_2$— in the alkyl may be replaced by —O—, —CH=CH—, cycloalkylene, or cycloalkenylene. Preferable examples of the alkyl include: an unsubstituted alkyl having 1 to 20 carbon atoms; alkoxyalkyl having 2 to 20 carbon atoms; or alkyl having 1 to 8 carbon atoms in which one of —CH$_2$— is replaced by cycloalkylene; an alkenyl having 2 to 20 carbon atoms; alkenyloxyalkyl having 2 to 20 carbon atoms; alkyloxyalkenyl having 2 to 20 carbon atoms; and alkyl having 1 to 8 carbon atoms in which one of —CH$_2$— is replaced by cycloalkenylene; and each of the aforementioned groups in which optional hydrogen is replaced by fluorine. Each of the cycloalkylene and the cycloalkenylene preferably has 3 to 8 carbon atoms.

Examples of the unsubstituted alkyl having 1 to 20 carbon atoms include methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl, and eicosyl.

Examples of a fluorinated alkyl having 1 to 20 carbon atoms include 3,3,3-trifluoropropyl, 3,3,4,4,5,5,6,6,6-nonadecafluorohexyl, tridecafluoro-1,1,2,2-tetrahydrooctyl, heptadecafluoro-1,1,2,2-tetrahydrodecyl, perfluoro-1H,1H,2H,2H-dodecyl, and perfluoro-1H,1H,2H,2H-tetradecyl.

Examples of the alkoxyalkyl having 2 to 20 carbon atoms include 3-methoxypropyl, methoxyethoxyundecyl, and 3-heptafluoroisopropoxypropyl.

Examples of the alkyl having 1 to 8 carbon atoms in which one of —CH$_2$— is replaced with cycloalkylene include cyclohexylmethyl, adamantaneethyl, cyclopentyl, cyclohexyl, 2-bicycloheptyl, and cyclooctyl. For example, methyl whose —CH$_2$— is replaced by cyclohexylene is cyclohexyl. For example, ethyl whose —CH$_2$— is replaced by cyclohexylene is cyclohexylmethyl.

Examples of the alkenyl having 2 to 20 carbon atoms include ethenyl, 2-propenyl, 3-butenyl, 5-hexenyl, 7-octenyl, and 10-undecenyl.

An example of the alkenyloxyalkyl having 2 to 20 carbon atoms includes an allyloxyundecyl.

Examples of the alkyl having 1 to 8 carbon atoms in which one of —CH$_2$— is replaced by cycloalkylene include 2-(3-cyclohexenyl)ethyl, 5-(bicycloheptenyl)ethyl, 2-cyclopentenyl, 3-cyclohexenyl, 5-norbornen-2-yl, and 4-cyclooctenyl.

Preferable examples of aryl whose optional hydrogen may be replaced by halogen or with an alkyl having 1 to 20 carbon atoms in $R^0$ in the formula (1-0) include phenyl whose optional hydrogen may be replaced by halogen or an alkyl having 1 to 8 carbon atoms, and unsubstituted naphthyl. Preferable examples of halogen include fluorine, chlorine, and bromine. In the alkyl having 1 to 8 carbon atoms as a substituent in the phenyl, optional hydrogen may be replaced by fluorine, and optional —CH$_2$— may be replaced by —O—, —CH=CH—, or phenylene. Preferable examples of an aryl represented by $R^0$ include unsubstituted phenyl, unsubstituted naphthyl, alkylphenyl, alkyloxyphenyl, alkenylphenyl, phenyl having a substituent having phenyl, and each of the aforementioned groups in which optional hydrogen is replaced by halogen. When the phenyl as $R^0$ has multiple substituents, the substituents may be identical to or different from each other.

Examples of halogenated phenyl include pentafluorophenyl, 4-chlorophenyl, and 4-bromophenyl.

Examples of the alkylphenyl include 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4-dimethylphenyl, 2,4,6-trimethylphenyl, 2,4,6-triethylphenyl, 4-(1-methylethyl)phenyl, 4-(1,1-dimethylethyl)phenyl, 4-(2-ethylhexyl)phenyl, and 2,4,6-tris(1-methylethyl)phenyl.

Examples of the alkyloxyphenyl include 4-methoxyphenyl, 4-ethoxyphenyl, 4-propoxyphenyl, 4-butoxyphenyl, 4-pentyloxyphenyl, 4-heptyloxyphenyl, 4-decyloxyphenyl, 4-octadecyloxyphenyl, 4-(1-methylethoxy)phenyl, 4-(2-methylpropoxy)phenyl, and 4-(1,1-dimethylethoxy)phenyl.

Examples of the alkenylphenyl include 4-ethenylphenyl, 4-(1-methylethenyl)phenyl, and 4-(3-butenyl)phenyl.

Examples of the phenyl having a substituent having phenyl include 4-(2-phenylethenyl)phenyl, 4-phenyloxyphenyl, 3-phenylmethylphenyl, biphenyl, and terphenyl. For example, ethylphenyl in which one of —CH$_2$— is replaced by phenylene and another —CH$_2$— is replaced by —CH═CH— in its ethyl is 4-(2-phenylethenyl)phenyl.

Examples of phenyl in which some of the hydrogen of the benzene ring are replaced by halogen and the other hydrogens are replaced by an alkyl, alkyloxyl, or alkenyl include 3-chloro-4-methylphenyl, 2,5-dichloro-4-methylphenyl, 3,5-dichloro-4-methylphenyl, 2,3,5-trichloro-4-methylphenyl, 2,3,6-trichloro-4-methylphenyl, 3-bromo-4-methylphenyl, 2,5-dibromo-4-methylphenyl, 3,5-dibromo-4-methylphenyl, 2,3-difluoro-4-methylphenyl, 3-chloro-4-methoxyphenyl, 3-bromo-4-methoxyphenyl, 3,5-dibromo-4-methoxyphenyl, 2,3-difluoro-4-methoxyphenyl, 2,3-difluoro-4-ethyoxyphenyl, 2,3-difluoro-4-propoxyphenyl, and 4-ethenyl-2,3,5,6-tetrafluorphenyl.

Examples of the case where R$^0$ in the formula (1-0) is an arylalkyl and optional hydrogen in the aryl of the arylalkyl may be replaced by halogen or alkyl having 1 to 20 carbon atoms are shown below. In the alkylene of the arylalkyl, optional hydrogen may be replaced by fluorine, and optional —CH$_2$— may be replaced by —O—, —CH═CH—, or cycloalkylene. A preferable example of the arylalkyl includes phenylalkyl. The alkylene in the phenylalkyl preferably has 1 to 8 carbon atoms. Examples of an unsubstituted phenylalkyl include phenylmethyl, 2-phenylethyl, 3-phenylpropyl, 4-phenylbutyl, 5-phenylpentyl, 6-phenylhexyl, 11-phenylundecyl, 1-phenylethyl, 2-phenylpropyl, 1-methyl-2-phenylethyl, 1-phenylpropyl, 3-phenylbutyl, 1-methyl-3-phenylpropyl, 2-phenylbutyl, 2-methyl-2-phenylpropyl, and 1-phenylhexyl.

In the phenylalkyl, optional hydrogen of the benzene ring may be replaced by halogen or alkyl having 1 to 8 carbon atoms. In the alkyl having 1 to 8 carbon atoms, optional hydrogen may be replaced by fluorine, and optional —CH$_2$— may be replaced by —O—, —CH═CH—, cycloalkylene, or phenylene. Examples of a phenylalkyl in which optional hydrogen of the phenyl is replaced by fluorine include 4-fluorophenylmethyl, 2,3,4,5,6-pentafluorophenylmethyl, 2-(2,3,4,5,6-pentafluorophenyl)ethyl, 3-(2,3,4,5,6-pentafluorophenyl)propyl, 2-(2-fluorophenyl)propyl, and 2-(4-flurophenyl)propyl.

Examples of phenylalkyl in which optional hydrogen of the benzene ring is replaced by chlorine include 4-chlorophenylmethyl, 2-chlorophenylmethyl, 2,6-dichlorophenylmethyl, 2,4-dichlorophenylmethyl, 2,3,6-trichlorophenylmethyl, 2,4,6-trichlorophenylmethyl, 2,4,5-trichlorophenylmethyl, 2,3,4,6-tetrachlorophenylmethyl, 2,3,4,5,6-pentachlorophenylmethyl, 2-(2-chlorophenyl)ethyl, 2-(4-chlorophenyl)ethyl, 2-(2,4,5-chlorophenyl)ethyl, 2-(2,3,6-chlorophenyl)ethyl, 3-(3-chlorophenyl)propyl, 3-(4-chlorophenyl)propyl, 3-(2,4,5-trichlorophenyl)propyl, 3-(2,3,6-trichlorophenyl)propyl, 4-(2-chlorophenyl)butyl, 4-(3-chlorophenyl)butyl, 4-(4-chlorophenyl)butyl, 4-(2,3,6-trichlorophenyl)butyl, 4-(2,4,5-trichlorophenyl)butyl, 1-(3-chlorophenyl)ethyl, 1-(4-chlorophenyl)ethyl, 2-(4-chlorophenyl)propyl, 2-(2-chlorophenyl)propyl, and 1-(4-chlorophenyl)butyl.

Examples of phenylalkyl in which optional hydrogen of the phenyl is replaced by bromine include 2-bromophenylmethyl, 4-bromophenylmethyl, 2,4-dibromophenylmethyl, 2,4,6-tribromophenylmethyl, 2,3,4,5-tetrabromophenylmethyl, 2,3,4,5,6-pentabromophenylmethyl, 2-(4-bromophenyl)ethyl, 3-(4-bromophenyl)propyl, 3-(3-bromophenyl)propyl, 4-(4-bromophenyl)butyl, 1-(4-bromophenyl)ethyl, 2-(2-bromophenyl)propyl, and 2-(4-bromophenyl)propyl.

Examples of phenylalkyl in which optional hydrogen of the benzene ring is replaced by an alkyl having 1 to 8 carbon atoms include 2-methylphenylmethyl, 3-methylphenylmethyl, 4-methylphenylmethyl, 4-dodecylphenylmethyl, 2,5-dimethylphenylmethyl, 2-(4-methylphenyl)ethyl, 2-(3-methylphenyl)ethyl, 2-(2,5-dimethylphenyl)ethyl, 2-(4-ethylphenyl)ethyl, 2-(3-ethylphenyl)ethyl, 1-(4-methylphenyl)ethyl, 1-(3-methylphenyl)ethyl, 1-(2-methylphenyl)ethyl, 2-(4-methylphenyl)propyl, 2-(2-methylphenyl)propyl, 2-(4-ethylphenyl)propyl, 2-(2-ethylphenyl)propyl, 2-(2,3-dimethylphenyl)propyl, 2-(2,5-dimethylphenyl)propyl, 2-(3,5-dimethylphenyl)propyl, 2-(2,4-dimethylphenyl)propyl, 2-(3,4-dimethylphenyl)propyl, 2-(2,5-dimethylphenyl)butyl, 4-(1-methylethyl)phenylmethyl, 2-(4-(1,1-dimethylethyl)phenyl)ethyl, 2-(4-(1-methylethyl)phenyl)propyl, and 2-(3-(1-methylethyl)phenyl)propyl.

Examples of phenylalkyl in which optional hydrogen of the benzene ring is replaced by an alkyl having 1 to 8 carbon atoms and hydrogen in the alkyl is replaced by fluorine include 3-trifluoromethylphenylmethyl, 2-(4-trifluoromethylphenyl)ethyl, 2-(4-nonafluorobutylphenyl)ethyl, 2-(4-tridecafluorohexylphenyl)ethyl, 2-(4-heptadecafluorooctylphenyl)ethyl, 1-(3-trifluoromethylphenyl)ethyl, 1-(4-trifluoromethylphenyl)ethyl, 1-(4-nonafluorobutylphenyl)ethyl, 1-(4-tridecafluorohexylphenyl)ethyl, 1-(4-heptadecafluorooctylphenyl)ethyl, 2-(4-nonafluorobutylphenyl)propyl, 1-methyl-1-(4-nonafluorobutylphenyl)ethyl, 2-(4-tridecafluorohexylphenyl)propyl, 1-methyl-1-(4-tridecafluorohexylphenyl)ethyl, 2-(4-heptadecafluorooctylphenyl)propyl, and 1-methyl-1-(4-heptadecafluorooctylphenyl)ethyl.

Examples of phenylalkyl in which optional hydrogen of the benzene ring is replaced by an alkyl having 1 to 8 carbon atoms and —CH$_2$— in the alkyl is replaced by —CH═CH— include 2-(4-ethenylphenyl)ethyl, 1-(4-ethenylphenyl)ethyl, and 1-(2-(2-propenyl)phenyl)ethyl.

Examples of phenylalkyl in which optional hydrogen of the benzene ring is replaced by an alkyl having 1 to 8 carbon atoms and —CH$_2$— in the alkyl is replaced by —O— include 4-methoxyphenylmethyl, 3-methoxyphenylmethyl, 4-ethoxyphenylmethyl, 2-(4-methoxyphenyl)ethyl, 3-(4-methoxyphenyl)propyl, 3-(2-methoxyphenyl)propyl, 3-(3,4-dimethoxyphenyl)propyl, 1-(4-methoxyphenyl)ethyl, (3-methoxymethylphenyl)ethyl, and 3-(2-nonadecafluorodecenyloxyphenyl)propyl.

Examples of phenylalkyl in which optional hydrogen of the benzene ring is replaced by an alkyl having 1 to 8 carbon atoms and one of —CH$_2$— in the alkyl is replaced by cycloalkylene include cyclopentylphenylmethyl, cyclopentyloxyphenylmethyl, cyclohexylphenylmethyl, cyclohexylphenylethyl, cyclohexylphenylpropyl, and cyclohexyloxyphenylmethyl. In these examples, the case where another —CH$_2$— of the alkyl is replaced by —O— is also included.

Examples of phenylalkyl in which optional hydrogen of the benzene ring is replaced by an alkyl having 1 to 8 carbon atoms and one of —CH$_2$— in the alkyl is replaced by phenylene include 2-(4-phenoxyphenyl)ethyl, 2-(4-phenoxyphenyl)propyl, 2-(2-phenoxyphenyl)propyl, 4-biphenylylmethyl, 3-biphenylylethyl, 4-biphenylylethyl, 4-biphenylylpropyl, 2-(2-biphenylyl)propyl, and 2-(4-biphenylyl)propyl. In these examples, the case where another —CH$_2$— of the alkyl is replaced by —O— is also included.

Examples of phenylalkyl in which at least two hydrogen of the benzene ring are replaced by different substituents include 3-(2,5-dimethoxy-3,4,6-trimethylphenyl)propyl, 3-chloro-2-methylphenylmethyl, 4-chloro-2-methylphenylmethyl, 5-chloro-2-methylphenylmethyl, 6-chloro-2-methylphenylmethyl, 2-chloro-4-methylphenylmethyl, 3-chloro-4-methylphenylmethyl, 2,3-dichloro-4-methylphenylmethyl, 2,5-dichloro-4-methylphenylmethyl, 3,5-dichloro-4-methylphenylmethyl, 2,3,5-trichloro-4-methylphenylmethyl, 2,3,5,6-tetrachloro-4-methylphenylmethyl, 2,3,4,6-tetrachloro-5-methylphenylmethyl, 2,3,4,5-tetrachloro-6-methylphenylmethyl, 4-chloro-3,5-dimethylphenylmethyl, 2-chloro-3,5-dimethylphenylmethyl, 2,4-dichloro-3,5-dimethylphenylmethyl, 2,6-dichloro-3,5-dimethylphenylmethyl, 2,4,6-trichloro-3,5-dimethylphenylmethyl, 3-bromo-2-methylphenylmethyl, 4-bromo-2-methylphenylmethyl, 5-bromo-2-methylphenylmethyl, 6-bromo-2-methylphenylmethyl, 3-bromo-4-methylphenylmethyl, 2,3-dibromo-4-methylphenylmethyl, 2,3,5-tribromo-4-methylphenylmethyl, and 2,3,5,6-tetrabromo-4-methylphenylmethyl.

More preferable examples of the phenyl in the phenylalkyl include: unsubstituted phenyl; and phenyl having, as a substituent, at least one of fluorine, alkyl having 1 to 4 carbon atoms, ethenyl, and methoxy.

Examples of phenylalkyl in which —$CH_2$— of the alkylene is replaced by —O—, —CH=CH—, or cycloalkylene include 3-phenoxypropyl, 1-phenylethenyl, 2-phenylethenyl, 3-phenyl-2-propenyl, 4-phenyl-4-pentenyl, 13-phenyl-12-tridecenyl, phenylcyclohexyl, and phenoxycyclohexyl.

Examples of phenylalkenyl in which hydrogen of the benzene ring is replaced by fluorine or methyl include 4-fluorophenylethenyl, 2,3-difluorophenylethenyl, 2,3,4,5,6-pentafluorophenylethenyl, and 4-methylphenylethenyl.

More preferable examples of $R^0$ include unsubstituted phenyl, halogenated phenyl, phenyl having at least one methyl, methoxyphenyl, naphthyl, phenylmethyl, phenylethyl, phenylbutyl, 2-phenylpropyl, 1-methyl-2-phenylethyl, pentafluorophenylpropyl, 4-ethylphenylethyl, 3-ethylphenylethyl, 4-(1,1-dimethylethyl)phenylethyl, 4-ethenylphenylethyl, 1-(4-ethenylphenyl)ethyl, 4-methoxyphenylpropyl, phenoxypropyl, cyclopentyl, and cyclohexyl. Further more preferable examples of $R^0$ include an unsubstituted phenyl, cyclopentyl, and cyclohexyl.

In addition, in the present invention, a polymer obtained by using the compound (1-0) having at least two alkenyl-containing groups or the compound (1-0) having at least two Si—H groups is preferable. The compound (1-0) having at least two alkenyl-containing groups is represented by the formula (1-1).

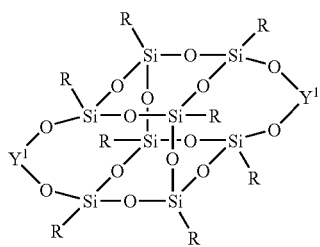
(1-1)

R in the formula (1-1) is a group defined in the same way as the $R^0$ in the formula (1-0), and preferable groups as R are the same as in the case of $R^0$. However, it is not preferable that each of R is hydrogen or alkenyl-containing group.

$Y^1$ in the formula (1-1) is a group represented by the formula (a-1) or (b-1).

In each of the formulae (a-1) and (b-1), at least one of $X^{11}$ is alkenyl-containing group, and the remaining $X^{11}$ independently represents chlorine, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—. Chlorine and a group defined in the same way as R are preferable as $X^{11}$ other than alkenyl-containing group, and a group defined in the same way as R is more preferable. As the group defined in the same way as R, alkyl having 1 to 8 carbon atoms, unsubstituted phenyl, cyclopentyl, and cyclohexyl are preferable, and alkyl having 1 to 4 carbon atoms and unsubstituted phenyl are more preferable. Methyl is the most preferable among the alkyl having 1 to 4 carbon atoms.

Z in the formula (b-1) represents a single bond, —O—, or —$CH_2$—, more preferably represents —O—. It is preferable that only one of the $X^{11}$ in each of the formulae (a-1) and (b-1) is alkenyl-containing group.

The group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O— may be an aliphatic group, a group having an aromatic ring, a group having an alicyclic ring, or a group having a silicon atom; provided that a group having any one of those groups together with alkenyl or Si—H is not included.

Examples of the alkenyl-containing group include alkenyl, alkenyloxyalkyl, alkenylphenyl, alkenyloxyphenyl, alkenylphenylalkyl, alkenyloxyphenylalkyl, alkenylcycloalkyl, and alkenyloxycycloalkyl. Of those, an alkenyl having 2 to 4 carbon atoms, styryl, vinyloxyphenyl, allyloxyphenyl are preferable. In addition, vinyl, allyl, and styryl are more preferable, and vinyl is further more preferable.

When the compound (1-1) is used, a compound having at least two Si—H groups is selected as a counterpart to perform a hydrosilylation reaction. In order that the resultant polymer has a linear chemical structure with no branch, a compound having two Si—H groups is preferably selected as a counterpart of the reaction with the compound (1-1). The selection of a silsesquioxane derivative or a compound having siloxane as such a counterpart can provide a polymer excellent in heat resistance, antiweatherability, or the like.

Examples of a compound as a preferable counterpart of the reaction with the compound (1-1) include the compound (1-2), the compound (2-1), the compound (3-1), the compound (4-1), the compound (5-1), and the compound (6-1). The compound (1-2) is preferably used when the compound (1-0) has Si—H group.

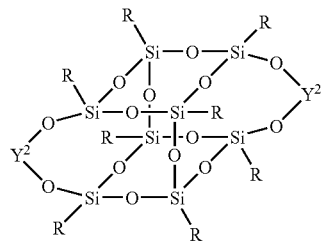
(1-2)

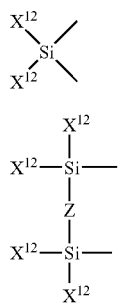
(a-2)

(b-2)

R in the formula (1-2) is a group defined in the same manner as R in the formula (1-1), and preferable examples of R are the same as those in the case of R in the formula (1-1). $Y^2$ is a group represented by the formula (a-2) or the formula (b-2). In each of the formulae (a-2) and (b-2), at least one of $X^{12}$ is hydrogen, and the remaining $X^{12}$ independently represents chlorine, a group defined in the same manner as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—. As $X^{12}$ other than hydrogen, chlorine and a group defined in the same manner as R is preferable, and a group defined in the same manner as R is more preferable. As the group defined in the same manner as R, an alkyl group having 1 to 8 carbon atoms, and unsubstituted phenyl, cyclopentyl, and cyclohexyl are preferable, and alkyl having 1 to 4 carbon atoms and unsubstituted phenyl are more preferable. Among the alkyl having 1 to 4 carbon atoms, methyl is the most preferable.

Z in the formula (b-2) represents a single bond, —O—, or —CH$_2$—, and preferably represents —O—. It s preferable that only one $X^{12}$ is hydrogen in each of the formulae (a-2) and (b-2).

The compound (2-1) is a hydrosilane derivative.

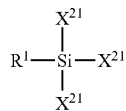
(2-1)

$R^1$ in the formula (2-1) is a group defined in the same manner as R in the formula (1-1), and preferable examples of $R^1$ are the same as those in the case of R in the formula (1-1). More preferable groups of $R^1$ include an alkyl having 1 to 8 carbon atoms, and unsubstituted phenyl, cyclopentyl, and cyclohexyl, and furthermore preferable examples thereof include an alkyl having 1 to 4 carbon atoms, and unsubstituted phenyl. As the alkyl having 1 to 4 carbon atoms, methyl is the most preferable. In the formula (2-1), at least two $X^{21}$ is hydrogen, and, preferably, two of the $X^{21}$ is hydrogen. In this case, the remaining $X^{21}$ is $R^1$.

The compound (3-1) is a silicon compound having a linear structure.

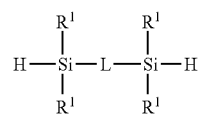
(3-1)

$R^1$ in the formula (3-1) is a group defined in the same manner as R in the formula (1-1), and preferable examples of $R^1$ are the same as those in the case of R in the formula (1-1). More preferable examples of $R^1$ include an alkyl having 1 to 8 carbon atoms, and unsubstituted phenyl, cyclopentyl, and cyclohexyl, and furthermore preferable examples thereof include an alkyl having 1 to 4 carbon atoms, and unsubstituted phenyl. As the alkyl having 1 to 4 carbon atoms, methyl is the most preferable. "L" represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the formula (c).

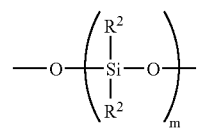
(c)

The formula (3-1) includes the followings.

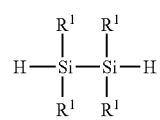
(3-1-1)

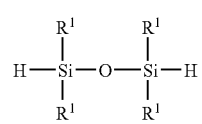
(3-1-2)

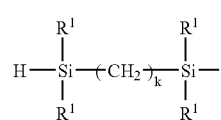
(3-1-3)

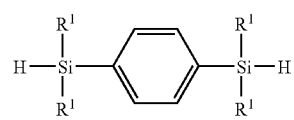
(3-1-4)

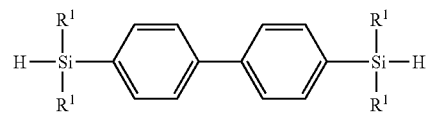
(3-1-5)

-continued (3-1-6)

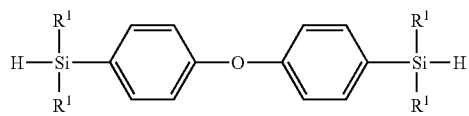

(3-1-7)

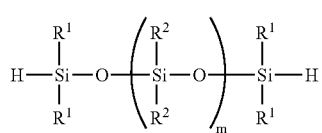

$R^1$ in the formulae (3-1-1) to (3-1-7) have the same meaning as that of R in the formula (3-1), and preferable examples of $R^1$ are the same as those in the case of R in the formula (3-1). "k" represents an integer of 1 to 4, $R^2$ is a group defined in the same manner as $R^1$, and "m" represents an integer of 1 to 30. In addition, among the compounds (3-1-1) to (3-1-7), the compound (3-1-7) is more preferable. The use of the compound as a counterpart of the compound (1-1) provides a polymer having a flexible molecular structure.

The compound (4-1) is a PSQ derivative having a cage-type structure.

(4-1)

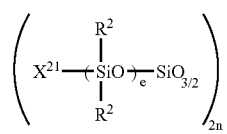

$R^2$ in the formula (4-1) is a group defined in the same manner as R in the formula (2-1). At least two $X^{21}$ is hydrogen, and, preferably, only two $X^{21}$ is hydrogen. In addition, they are preferably placed at positions distant from each other. The remaining $X^{21}$ is a group defined in the same manner as R in the formula (1-1), and preferable examples of $X^{21}$ are the same as those in the case of R in the formula (1-1). "e" represents 0 or 1. "n" represents an integer of 3 to 30. "n" preferably represents 4 to 6.

The compound (5-1) is a silicon compound having a structure obtained by breaking one corner of the cage-type structure of octasilsesquioxane.

(5-1)

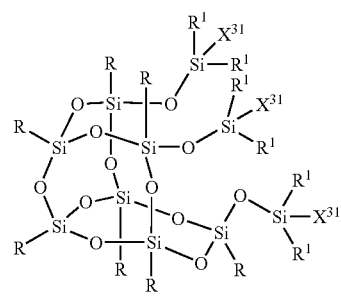

Each of R and $R^1$ in the formula (5-1) represents a group defined in the same manner as in R in the formula (1-1). At least two $X^{31}$ are hydrogen, and the remaining $X^{31}$ is $R^1$. Preferable examples of R are the same as those in the case of R in the formula (1-1). Preferable examples of $R^1$ are the same as those in the case of $R^1$ in the formula (2-1).

The compound (6-1) is a silicon compound having a structure obtained by breaking two corners of the cage-type structure of octasilsesquioxane.

(6-1)

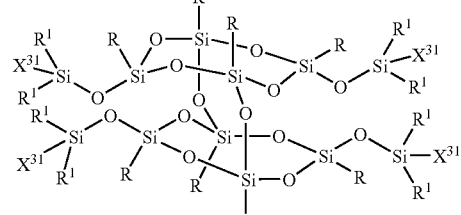

R and $R^1$ in the formula (6-1) is a group defined in the same manner as R in the formula (1-1). At least two of the $X^{31}$ are hydrogen, and the remaining $X^{31}$ is $R^1$. Preferable examples of R are the same as those in the case of R in the formula (1-1). Preferable examples of $R^1$ are the same as those in the case of $R^1$ in the formula (2-1).

Hereinafter, the compound (1-0) having at least two Si—H groups is explained. Such compound (1-0) is the above-described compound (1-2).

(1-2)

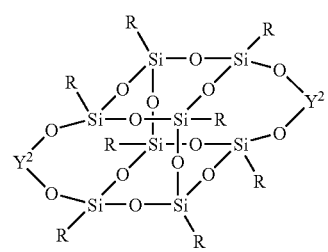

R in the formula (1-2) is a group defined in the same manner as $R^0$ in the formula (1-0), and preferable groups as R is the same as in the case of $R^0$. However, it is not preferable that R is hydrogen or an alkenyl-containing group.

$Y^2$ in the formula (1-2) is a group represented by the formula (a-2) or (b-2).

(a-2)

(b-2)

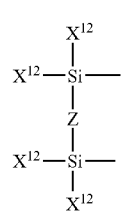

In each of the formulae (a-2) and (b-2), at least one of $X^{12}$ is hydrogen. The remaining $X^{12}$ independently represents chlorine, a group defined in the same manner as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—. As $X^{21}$ other than hydrogen, chlorine and a group defined in the same manner as R is preferable, and a group defined in the same manner as R is more preferable. As the group defined in the same manner as R, alkyl having 1 to 8 carbon atoms, and unsubstituted phenyl, cyclopentyl, and cyclohexyl are preferable, and an alkyl having 1 to 4 carbon atoms and unsubstituted phenyl are more preferable. As the alkyl having 1 to 4 carbon atoms, methyl is the most preferable. Z in the formula (b-2) represents a single bond, —O—, or —CH$_2$—, or more preferably represents —O—. It is preferable that only one $X^{12}$ in each of the formula (a-2) and the formula (b-2) is hydrogen.

The group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O— may be an aliphatic group, a group having an aromatic ring, a group having an alicyclic ring, or a group having a silicon atom; provided that a group having any one of those groups together with alkenyl or Si—H is not included.

When the compound (1-2) is used, a compound having at least two alkenyl-containing groups or a compound having a carbon-carbon triple bond is selected as a counterpart to perform a hydrosilylation reaction. In order that the resultant polymer has a linear chemical structure with no branch, a compound having two alkenyl-containing groups or a compound having one or two carbon-carbon triple bond is preferably selected as a counterpart of the reaction with the compound (1-2). The selection of a silsesquioxane derivative or a compound having siloxane as such a counterpart can provide a polymer excellent in heat resistance, anti-weatherability, or the like. Examples of the alkenyl-containing group and preferable examples thereof are as described above.

Examples of a compound as a preferable counterpart of the reaction with the compound (1-2) include the compound (2-2), the compound (3-2), the compound (4-2), the compound (5-2), the compound (6-2), the compound (d-1), the compound (d-2), the compound (d-3) and the compound (d-4). The compound (2-2) is a hydrosilane derivative.

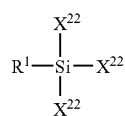
(2-2)

$R^1$ in the formula (2-2) is a group defined in the same manner as R in the formula (1-2), and preferable examples of $R^1$ are the same as those in the case of R in the formula (1-2). More preferable examples of $R^1$ include an alkyl having 1 to 8 carbon atoms, and unsubstituted phenyl, cyclopentyl, and cyclohexyl, and furthermore preferable examples thereof include an alkyl having 1 to 4 carbon atoms, and unsubstituted phenyl. As the alkyl having 1 to 4 carbon atoms, methyl is the most preferable. At least two $X^{22}$ are alkenyl-containing group or carbon-carbon triple bond-containing group, and, it is preferable that two of the $X^{21}$ is alkenyl-containing group or carbon-carbon triple bond-containing group. In this case, the remaining $X^{22}$ is $R^1$. The following compound is an example of the compound having a carbon-carbon triple bond. Examples of an alkenyl-containing group represented by $X^{22}$ and preferable examples thereof are as described above.

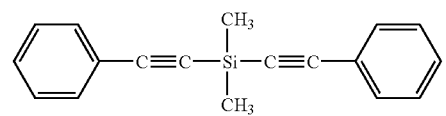

The compound (3-2) is a silicon compound having a linearly-bound structure.

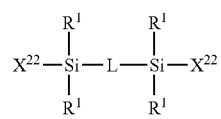
(3-2)

$R^1$ in the formula (3-2) is a group defined in the same manner as R in the formula (1-2), and preferable examples of $R^1$ are the same as those in the case of R in the formula (1-2). More preferable examples of $R^1$ include an alkyl having 1 to 8 carbon atoms, and unsubstituted phenyl, cyclopentyl, and cyclohexyl, and furthermore preferable examples thereof include an alkyl having 1 to 4 carbon atoms, and unsubstituted phenyl. As the alkyl having 1 to 4 carbon atoms, methyl is the most preferable. "L" represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the formula (c).

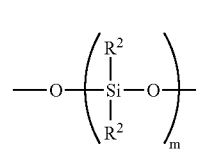
(c)

The formula (3-2) includes the followings.

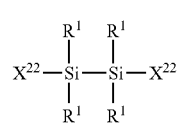
(3-2-1)

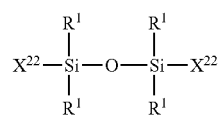
(3-2-2)

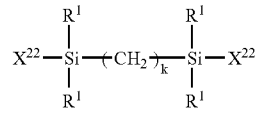
(3-2-3)

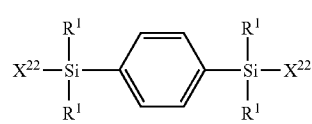
(3-2-4)

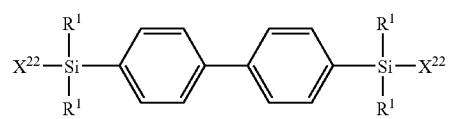
(3-2-5)

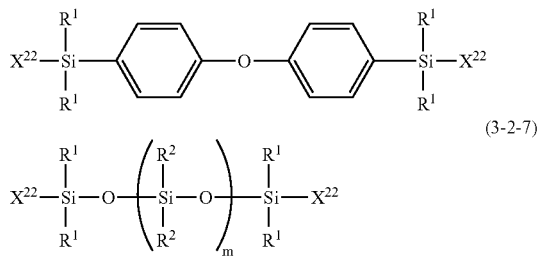

(3-2-6)

(3-2-7)

R¹ in the formulae (3-2-1) to (3-2-7) have the same meaning as R in the formula (3-2), and preferable examples of R¹ are the same as those in the case of R in the formula (3-2). "k" represents an integer of 1 to 4, R² is a group defined in the same manner as R¹, and "m" represents an integer of 1 to 30. In addition, $X^{22}$ is an alkenyl-containing group or a group having a carbon-carbon triple bond. Examples of an alkenyl-containing group represented by $X^{22}$ and preferable examples thereof are as described above. In addition, among the compounds (3-2-1) to (3-2-7), the compound (3-2-7) is preferable. The use of this compound as a counter part of the compound (1-2) provides a polymer having a flexible molecular structure.

The compound (4-2) is a PSQ derivative having a cage-type structure.

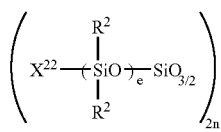

(4-2)

R² in the formula (4-2) is a group defined in the same manner as R¹ in the formula (2-2). At least two of the $X^{22}$ are alkenyl-containing group or carbon-carbon triple bond-containing group, and it is preferable that only two of the $X^{22}$ are alkenyl-containing group. It is preferable that the two of the alkenyl-containing groups are placed at positions distant from each other. Examples of the alkenyl-containing group and preferable examples thereof are as described above. The remaining $X^{22}$ is a group defined in the same manner as R in the formula (1-2), and preferable examples of $X^{22}$ are the same as those in the case of R in the formula (1-2). "e" represents 0 or 1. "n" represents an integer of 3 to 30, and "n" preferably represents 4 to 6.

The compound (5-2) is a silicon compound having a structure obtained by breaking one corner of the cage-type structure of octasilsesquioxane.

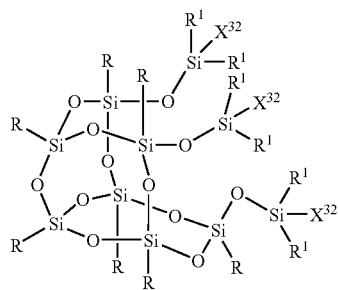

(5-2)

Each of R and R¹ in the formula (5-2) is a group defined in the same manner as R in the formula (1-2). At least two of the $X^{32}$ are alkenyl-containing group or carbon-carbon triple bond-containing group, and the remaining $X^{32}$ is R¹. Examples of an alkenyl-containing group represented by $X^{32}$ and preferable examples thereof are as described above. Preferable examples of R are the same as those in the case of R in the formula (1-2). Preferable examples of R¹ are the same as those in the case of R¹ in the formula (2-2).

The compound (6-2) is a silicon compound having a structure obtained by breaking two corners of the cage-type structure of octasilsesquioxane.

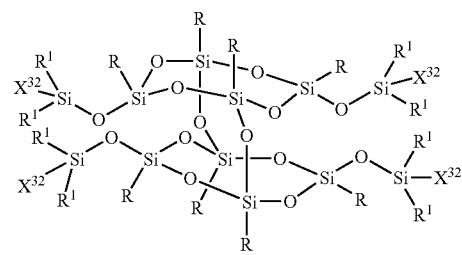

(6-2)

R and R¹ in the formula (6-2) represents a group defined in the same manner as R in the formula (1-2). At least two of the $X^{32}$ are alkenyl-containing group or carbon-carbon triple bond-containing group, and the remaining $X^{32}$ is R¹. Examples of alkenyl-containing group represented by X³ and preferable examples thereof are as described above. Preferable examples of R are the same as those in the case of R in the formula (1-2). Preferable examples of R¹ are the same as those in the case of R¹ in the formula (2-2).

The compounds (d-1) to (d-4) are examples of a compound having alkenyl or a carbon-carbon triple bond, other than the above-described silicon compounds.

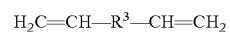  (d-1)

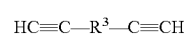  (d-2)

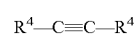  (d-3)

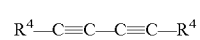  (d-4)

In each of the formulae (d-1) to (d-4), R³ represents an alkyl having 1 to 40 carbon atoms or phenyl whose optional hydrogen may be replaced by halogen or alkyl having 1 to 4 carbon atoms, R⁴ represents an alkyl having 1 to 8 carbon atoms or phenyl whose optional hydrogen may be replaced by halogen or alkyl having 1 to 4 carbon atoms, and optional —CH₂— in each of the alkyl having 1 to 40 carbon atoms and the alkyl having 1 to 8 carbon atoms may be replaced by —O— or —COO—.

Examples of these compounds are shown below. In the following formula, "k1" represents an integer of 1 to 12.

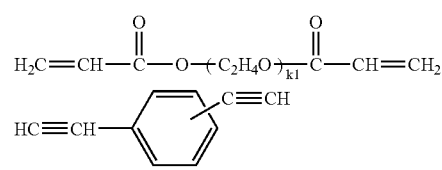

-continued

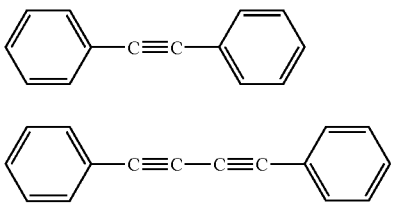

Compounds having alkenyl or carbon-carbon triple bond other than silicon compounds are not limited to the compounds (d-1) to (d-4) as described above. For example, such a compound as shown below is also available.

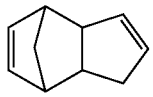

Each of the compounds (1-1) and (1-2) used in the present invention can be produced by the method as described in WO 03/024870. Each of the compounds (4-1) and (4-2) can be produced by the method as described in WO 03/004549 (US 2005-49381). Each of the compounds (5-1) and (5-2) can be produced by the method as described in JP2005-0156738A. Each of the compounds (6-1) and (6-2) can be produced by the method as described in WO 2004/024741. Some of the compounds used in the present invention except the compounds (1-0), (6-1), and (6-2) are available from Hybrid Plastics.

A solvent to be used for the hydrosilylation polymerization is not particularly limited as long as it does not inhibit the progress of the reaction. Examples of a preferable solvent include: hydrocarbon-based solvents such as hexane and heptane; aromatic hydrocarbon-based solvents such as benzene, toluene, and xylene; ether-based solvents such as diethyl ether, tetrahydrofuran (THF), and dioxane; halogenated hydrocarbon-based solvents such as methylene chloride and carbon tetrachloride; and ester-based solvents such as ethyl acetate. Each of those solvents may be used alone, or two or more of them may be used in combination. Of those solvents, aromatic hydrocarbon-based solvents are preferable. Of the aromatic hydrocarbon-based solvents, toluene is most preferable. Although a solvent is not always necessary, a ratio of the compound of the present invention, if used, is preferably 0.05 to 80 wt %, or more preferably 30 to 70 wt % with respect to the weight of the solvent. The ratio varies depending on a purpose.

The hydrosilylation polymerization may be performed at room temperature. The polymerization may also be performed under heating for promoting the polymerization. The polymerization may also be performed under cooling for controlling heat generation due to the polymerization or unpreferable polymerization. A catalyst can be used as required in the hydrosilylation polymerization. The addition of a hydrosilylation catalyst can allow the polymerization to progress easily. Examples of a preferable hydrosilylation catalyst include Karstedt catalyst, Spier catalyst, and hexachloroplatinic acid. Those generally well known catalysts. The addition of any one of those hydrosilylation catalysts in a small amount can allow the reaction to sufficiently progress because each of the catalysts has high reactivity. Each of those hydrosilylation catalysts is used in such amount that a ratio of a transition metal in the catalyst to a hydrosilyl is $10^{-9}$ to 1 mol %. The catalyst is preferably added in such a manner that the ratio is $10^{-7}$ to $10^{-3}$ mol %. An addition ratio of $10^{-9}$ mol % is a lower limit necessary for enabling the reaction to progress and for completing the reaction within an allowable time period. Therefore, the ratio is preferably 1 mol % or less in consideration of a reduction in production cost.

A polymer obtained by introducing a skeleton having a cage-type structure into a main chain is expected to provide high heat resistance and high solvent resistance, because rigidity is imparted to the polymer owing to the limitations on the movement of the main chain. A compound having a cage-type structure is preferably used as a counterpart of the compound (1-0) in order that this effect may be expressed with improved conspicuousness. An example of a preferable combination is a combination of: at least one of the compounds (1-2), (4-1), (5-1), and (6-1) with the compound (1-1). Another example of a preferable combination is: at least one of the compounds (4-2), (5-2) and (6-2); with the compound (1-2). In addition, a combination of the compound (1-1) with the compound (1-2) is most preferable. Meanwhile, the flexibility, transparency, dielectric constant, refractive index, and the like of the polymer can be controlled in accordance with purposes by adjusting the physical properties such as the length, hardness, and constituent atoms of a molecular chain of respective reaction components, reaction conditions, and the like. Specifically, the combined use of at least one of the compounds (3-1), (3-2), (d-1) and (d-2) together with the above-mentioned compounds can provide the flexibility of the polymer. For example, at least one of the compounds (3-1), (3-2), (d-1) and (d-2) are used in the following combinations. An example of such a combination includes the combination of at least one of the compounds (1-2), (5-1) and (6-1); and the compound (1-1); and the compound (3-1). Another example includes the combination of at least one of the compounds (5-2) and (6-2); and the compound (1-2); and at least one of the compounds (3-2), (d-1) and (d-2). The combination of the compounds (1-1) and (3-1) can also be used. The combination of the compounds (1-2) and at least one of the compounds (3-2), (d-1) and (d-2) can also be used.

A polymer obtained by introducing a skeleton having a cage-type structure into a main chain is excellent in, for example, heat resistance, solvent resistance, mechanical strength, optical permeability, dielectric constant, flame retardancy, adhesiveness, and processability. As a result, the polymer can be used in a wide variety of applications including: electrical and electronic materials such as a coating agent for a substrate (for example, an antireflection film) and a coating agent for a semiconductor (for example, an interlayer insulator); and optical elements such as a microlens, a light-guiding plate, and an optical waveguide material. In addition, the polymer may be blended with another component such as an anti-oxidant, a coloring agent or a filler before use if necessary provided that the inherent properties of the polymer are not impaired.

Another polymer can be obtained by using a PSQ derivative represented by the formula (1-4) by a reaction other than hydrosilylation.

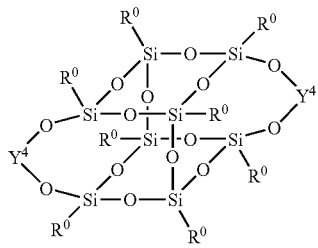
(1-4)

$R^0$ in the formula (1-4) is a group defined in the same manner as $R^0$ in the formula (1-0), and preferable examples of R are the same as those in the case of $R^0$ in the formula (1-0).

In addition, $Y^4$ in the formula (1-4) is a group represented by the formula (a-4) or (b-4).

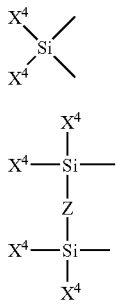
(a-4)
(b-4)

In each of the formulae (a-4) and (b-4), $X^4$ independently represents chlorine, a group defined in the same manner as $R^0$, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—. At least one of $X^4$ is a reactive group selected from chlorine, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$. In each of the formulae (a-4) and (b-4), it is preferably that only one $X^4$ is a reactive group. Z in the formula (b-4) represents a single bond, —O—, or —CH$_2$—, and a preferable example of Z is —O—.

A polymer can be obtained by reacting a compound having at least two groups capable of reacting with those reactive groups with the compound (1-4).

The compound (1-4) can be produced by the method described in WO 03/024870.

Examples of a combination of the compound (1-4) and a compound as a counterpart are shown below.

When $Y^4$ in the formula (1-4) is a group represented by the formula (a-2), a compound represented by the formula (8-2) is a preferable counterpart of the reaction with the compound (1-4). A polymer can be obtained by subjecting those compounds to dehydration condensation.

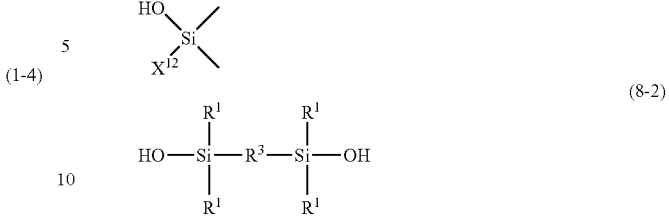
(a-2)
(8-2)

In the formula (a-2), $X^{12}$ is an alkyl having 1 to 4 carbon atoms or unsubstituted phenyl.

In the formula (8-2), $R^1$ independently represents an alkyl having 1 to 4 carbon atoms or unsubstituted phenyl, and $R^3$ represents a phenyl, naphthalene, or anthracene.

An ether-based solvent such as diethyl ether or diisopropyl ether, or an ester-based solvent such as ethyl acetate, propyl acetate or butyl acetate that readily dissolves the compounds (1-2) and (8-2), and a hydrocarbon-based solvent such as hexane or heptane, an aromatic hydrocarbon-based solvent such as benzene, toluene or xylene, or a halogenated hydrocarbon-based solvent such as methylene chloride or carbon tetrachloride that readily dissolves the polymer are preferably mixed and used as a solvent to be used for the dehydration condensation reaction. However, available solvent is not limited to the solvent as long as both the compounds and the produced polymer can be dissolved. A ratio of the compound of the present invention is preferably 1 wt % to 80 wt %, or more preferably 20 wt % to 50 wt % with respect to the weight of the solvent.

Examples of a catalyst to be used for the dehydration condensation reaction include: amines such as triethylamine, tributylamine, di-iso-propylamine, N,N-diethylhexylamine, 1,4-diazabicyclo[2.2.2]octane, 1,8-diazabicyclo[5.4.0]undeca-7-ene, and 2,5-diazabicyclo[2.2.1]heptane; and tetramethylguanidium-2-ethylhexoate. A catalyst concentration is 0.01 to 10.0%, or preferably 0.1 to 1.0% with respect to a substrate.

The dehydration condensation reaction can progress by azeotropic dehydration.

The compounds (1-4) and (8-2) react with each other at such molar ratio that the compound (1-4) accounts for 10 mol % to 80 mol %, preferably 50 mol % to 75 mol % of the total amount of the both compounds.

The molecular weight of the polymer obtained by the dehydration condensation reaction is suitably 3,000 to 1,000,000.

When $Y^4$ in the formula (1-4) is a group represented by the formula (a-3), a carboxylic acid or an epoxy is a preferable counterpart of the reaction with the compound (1-4).

(a-3)

In the formula (a-3), $R^4$ is a divalent organic group having 1 to 20 carbon atoms, and $X^{13}$ is an alkyl having 1 to 4 carbon atoms or unsubstituted phenyl.

Carboxylic acid to be used as such a counterpart is multivalent carboxylic acid selected from tetracarboxylic acid and dicarboxylic acid. The term "tetracarboxylic acid" is used as a generic term including tetracarboxylic acid as well as an ester of tetracarboxylic acid, acid anhydride, and acid halide. The "dicarboxylic acid" is the term defined in the same manner as tetracarboxylic acid.

The tetracarboxylic acid may be aliphatic, alicyclic, or aromatic. Each of those acids may have a siloxane group, or may be optically active. Some tetracarboxylic dianhydrides have isomers, and a mixture containing the isomers is also available. Two or more tetracarboxylic dianhydrides may be used together. When two or more tetracarboxylic dianhydrides are used, such tetracarboxylic dianhydrides may be those derived from one kind of tetracarboxylic acid selected from aliphatic ones, alicyclic ones, and aromatic ones, or each of the tetracarboxylic dianhydrides may be those derived from different kinds of tetracarboxylic acids. Examples of the tetracarboxylic dianhydride to be used in the present invention are shown below. However, the tetracarboxylic dianhydride is not limited to the following examples.

Examples of an aliphatic tetracarboxylic dianhydride include ethane tetracarboxylic dianhydride and butane tetracarboxylic dianhydride.

Examples of the alicyclic tetracarboxylic dianhydride include: cyclobutane tetracarboxylic dianhydride; cyclopentane tetracarboxylic dianhydride; bicycloheptane tetracarboxylic dianhydride; bicyclooctane tetracarboxylic dianhydride; bicyclo[2.2.2]-octo-7-ene-2,3,5,6-tetracarboxylic dianhydride; cyclohexane-1,2,5,6-tetracarboxylic dianhydride; 3,4-dicarboxy-1,2,3,4-tetrahydronaphthalene-1-succinic dianhydride; 3,3'-bicyclohexyl-1,1',2,2'-tetracarboxylic dianhydride; 2,3,5-tricarboxycyclopentylacetic dianhydride; 5-(2,5-dioxotetrahydrofural)-3-methyl-3-cyclohexene-1,2-dicarb oxylic dianhydride; 1,3,3a,4,5,9b-hexahydro-5-tetrahydro-2,5-dioxo-3-furanyl)-naph tho[1,2-c]-furane-1,3-dione; 3,5,6-tricarboxynorbornane-2-acetic dianhydride; 2,3,4,5-tetrahydrofurantetracarboxylic dianhydride; and tetracyclo[6.2.11.3.02,7]-dodecane-4,5,9,10-tetracarboxylic dianhydride. An acid dianhydride represented by the following structural formula can also be exemplified. Optional hydrogen in each of those compounds may be substituted by a lower alkyl such as a methyl or ethyl.

Examples of an aromatic tetracarboxylic dianhydride include: pyromellitic dianhydride; 3,3',4,4'-benzophenonetetracarboxylic dianhydride; naphthalenic dianhydride (such as 2,3,6,7-naphthalenic anhydride); 3,3'-4,4'-diphenylmethanetetracarboxylic dianhydride; 3,3'-4,4'-diphenylethanetetracarboxylic dianhydride; 3,3'-4,4'-diphenylpropanetetracarboxylic dianhydride; 3,3'-4,4'-diphenylsulfonetetracarboxylic dianhydride; 3,3',4,4'-diphenylethertetracarboxylic dianhydride; 3,3',4,4'-dimethyldiphenylsilanetetracarboxylic dianhydride; 4,4'-bis(3,4-dicarboxyphenoxy)diphenylsulfide dianhydride; 4,4'-bis(3,4-dicarboxyphenoxy)diphenylsulfone dianhydride; 4,4'-bis(3,4-dicarboxyphenylmethyl)diphenylmethane dianhydride; 4,4'-bis(3,4-dicarboxyphenylmethyl)diphenylethane dianhydride; 4,4'-bis(3,4-dicarboxyphenylmethyl)diphenylpropane dianhydride; 4,4'-bis(3,4-dicarboxypheoxy)diphenylmethane dianhydride; 4,4'-bis(3, 4-dicarboxyphenoxy)diphenylethane dianhydride; 4,4'-bis (3,4-dicarboxyphenoxy)diphenylpropane dianhydride; 3,3', 4,4'-perfluoropropylidenediphthalic dianhydride; 3,3',4,4'-biphenyltetracarboxylic dianhydride; bis(phthalic acid) phenylsulfinoxide dianhydride; p-phenylene-bis (triphenylphthalic acid) dianhydride; m-phenylene-bis (triphenylphthalic acid) dianhydride; bis(triphenylphthalic acid)-4,4'-diphenylether dianhydride; and bis(triphenylphthalic acid)-4,4'diphenylmethane dianhydride.

The dicarboxylic acid may be aliphatic, alicyclic, or aromatic. Each of those dicarboxylic acids may have a siloxane group, or may be optically active. Some dicarboxylic acids have isomers, and a mixture containing the isomers is also available. Two or more dicarboxylic acids may be used together. When two or more dicarboxylic acids are used, these dicarboxylic acids may be those derived from one kind of dicarboxylic acid selected from aliphatic one, alicyclic one, and aromatic one, or each of the dicarboxylic acids may be those derived from different kinds of dicarboxylic acids. Examples of the dicarboxylic acid to be used in the present invention are shown below. However, the dicarboxylic acid is not limited to the following examples.

Examples of an aliphatic dicarboxylic acid include malonic acid, oxalic acid, dimethylmalonic acid, succinic acid, fumaric acid, glutaric acid, adipic acid, muconic acid, 2-methyladipic acid, trimethyladipic acid, pimelic acid, 2,2-dimethylglutaric acid, 3,3-diethylsuccinic acid, azelaic acid, sebacic acid, and suberic acid.

Examples of an alicyclic dicarboxylic acid include: 1,1-cyclopropanedicarboxylic acid; 1,2-cyclopropanedicarboxylic acid; 1,1-cyclobutanedicarboxylic acid; 1,2-cyclobutanedicarboxylic acid; 1,3-cyclobutanedicarboxylic acid; 3,4-diphenyl-1,2-cyclobutanedicarboxylic acid; 2,4-diphenyl-1,3-cyclobutanedicarboxylic acid; 1-cyclobutene-1,2-dicarboxylic acid; 1-cyclobutene-3,4-dicarboxylic acid; 1,1-cyclopentanedicarboxylic acid; 1,2-cyclopentanedicarboxylic acid; 1,3-cyclopentanedicarboxylic acid; 1,1-cyclohexanedicarboxylic acid; 1,2-cyclohexanedicarboxylic acid; 1,3-cyclohexanedicarboxylic acid; 1,4-cyclohexanedicarboxylic acid; 1,4-(2-norbornene)dicarboxylic acid; norbornene-2,3-dicarboxylic acid; bicyclo[2.2.2]octane-1,4-dicarboxylic acid; bicyclo[2.2.2]octane-2,3-dicarboxylic acid; 2,5-dioxo-1,4-bicyclo[2.2.2]octanedicarboxylic acid; 1,3-adamantanedicarboxylic acid; 4,8-dioxo-1,3-adamantanedicarboxylic acid; 2,6-spiro[3.3]heptanedicarboxylic acid; 1,3-adamantanediacetic acid; and camphor acid.

Examples of an aromatic dicarboxylic acid include: o-phthalic acid; isophthalic acid; terephthalic acid; 5-methylisophthalic acid; 5-tert-butylisophthalic acid; 5-aminoisophthalic acid; 5-hydroxyisophthalic acid; 2,5-dimethylterephthalic acid; tetramethylterephthalic acid; 1,4-naphthalenedicarboxylic acid; 2,5-napthalenedicarboxylic acid; 2,6-naphthalenedicarboxylic acid; 2,7-naphthalenedicarboxylic acid; 1,4-anthracenedicarboxylic acid; 1,4-anthraquinonedicarboxylic acid; 2,5-biphenyldicarboxylic acid; 4,4'-biphenyldicarboxylic acid; 1,5-biphenylenedicarboxylic acid; 4,4"-tert-phenyldicarboxylic acid; 4,4'-diphenylmethanedicarboxylic acid; 4,4'-diphenylethanedicarboxylic acid; 4,4'-diphenylpropanedicarboxylic acid; 4,4'-diphenylhexafluoropropanedicarboxylic acid; 4,4'-diphenylether dicarboxylic acid; 4,4'-bibenzyldicarboxylic acid; 4,4'-stilbenedicarboxylic acid; 4,4'-trandicarboxylic acid; 4,4'-carbonyldibenzoic acid; 4,4'-sulfonyldibenzocid acid; 4,4'-dithiodibenzoic acid; p-phenylenediacetic acid; 3,3'-p-phenylenedipropionic acid; 4-carboxycinnamic acid; p-phenylenediacrylic acid; 3,3'-(4,4'-(methylenedi-p-phenylene))dipropionic acid; 4,4'-(4,4'-(oxydi-p-phenylene)) dipropionic acid; 4,4'-(4,4'-(oxydi-p-phenylene))dibutyric acid; (isopropylidenedi-p-phenylenedioxy)dibutyric acid; and bis(p-carboxyphenyl)dimethylsilane.

Examples of a dicarboxylic acid having a heterocyclic ring include: 1,5-(9-oxofluorene)dicarboxylic acid; 3,4-furandicarboxylic acid; 4,5-thiazoledicarboxylic acid; 2-phenyl-4,5-thiazoledicarboxylic acid; 1,2,5-thiadiazole-3, 4-dicarboxylic acid; 1,2,5-oxadiazole-3,4-dicarboxylic acid; 2,3-pyridinedicarboxylic acid; 2,4-pyridinedicarboxylic acid; 2,5-pyridinedicarboxylic acid; 2,6-pyridinedicarboxylic acid; 3,4-pyridinedicarboxylic acid; and 3,5-pyridinedicarboxylic acid.

The epoxy compounds may be aliphatic, alicyclic, or aromatic. Each of those epoxy compounds may have a siloxane group, or may be optically active. Some epoxy compounds have isomers, and a mixture containing the isomers is also available. Two or more epoxy compounds may be used together. When two or more epoxy compounds are used, such compounds may be selected from one kind of epoxy compound selected from aliphatic one, alicyclic one, and aromatic one, or each of the epoxy compounds may be selected from different kinds of epoxy compound.

When $Y^4$ in the formula (1-4) is a group represented by the formula (a-4), a diamine is a preferable counterpart of the reaction with the compound (1-4).

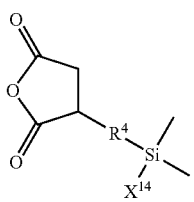

(a-4)

In the formula (a-4), $R^4$ is a divalent organic group having 1 to 20 carbon atoms, and $X^{14}$ is an alkyl having 1 to 4 carbon atoms or unsubstituted phenyl.

The diamines may be aliphatic, alicyclic, or aromatic. Each of those diamines may have a siloxane, or may be optically active. Examples of the aliphatic diamine include ethylenediamine, trimethylenediamine, tetramethylenediamine, pentamethylenediamine, and hexamethylenediamine. A diamine having a structure obtained by replacing an optional —CH$_2$— in any one of those alkylenediamines by —O— is also available. Some diamines have isomers, and a mixture containing the isomers is also available. Two or more diamines may be used together. When two or more diamines are used, such diamines may be selected from one kind of diamine selected from aliphatic one, alicyclic one, and aromatic one, or each of the diamines may be selected from different kinds of diamines. Examples of the diamine to be used in the present invention are shown below. However, the diamine is not limited to the following examples.

Examples of an alicyclic diamine include: 1,4-diaminodicyclohexane; 1,3-bis(aminomethyl)cyclohexane; 1,4-bis(aminomethyl)cyclohexane; 4,4'-diaminodicyclohexylmethane; bis(2-methyl-4-aminocyclohexyl)methane; isophoronediamine; 2,5-bis(aminomethyl)-bicyclo[2.2.1]heptane; 2,6-bis(aminomethyl)-bicyclo[2.2.1]heptane; 2,3-diaminobicyclo[2.2.1]heptane; 2,5-diaminobicyclo[2.2.1]heptane; 2,6-diaminobicyclo[2.2.1]heptane; 2,7-diaminobicyclo[2.2.1]heptane; 2,3-diamino-7-azabicyclo[2.2.1]heptane; 2,5-diamino-7-azabicyclo[2.2.1]heptane; 2,6-diamino-7-azabicyclo[2.2.1]heptane; 2,3-diamino-7-thiabicyclo[2.2.1]heptane; 2,5-diamino-7-thiabicyclo[2.2.1]heptane; 2,6-diamino-7-thiabicyclo[2.2.1]heptane; 2,3-diaminobicyclo[2.2.2]octane; 2,5-diaminobicyclo[2.2.2]octane; 2,6-diaminobicyclo[2.2.2]octane; 2,5-diaminobicyclo[2.2.2]octan-7-ene; 2,5-diamino-7-azabicyclo[2.2.2]octane; 2,5-diamino-7-oxabicyclo[2.2.2] octane; 2,5-diamino-7-thiabicyclo[2.2.2]octane; 2,6-diaminobicyclo[3.2.1]octane; 2,6-diaminoazabicyclo[3.2.1] octane; 2,6-diaminooxabicyclo[3.2.1]octane; 2,6-diaminothiabicyclo[3.2.1]octane; 2,6-diaminobicyclo[3.2.2] nonane; 2,6-diaminobicyclo[3.2.2]nonan-8-ene; 2,6-diamino-8-azabicyclo[3.2.2]nonane; 2,6-diamino-8-oxabicyclo[3.2.2]nonane; and 2,6-diamino-8-thiabicyclo[3.2.2]nonane.

Examples of an aromatic diamine include: 2,2-bis(4-aminophenyl)propane; 2,6-diaminopyridine; bis-(4-aminophenyl)diethylsilane; bis-(4-aminophenyl)diphenylsilane; bis-(4-aminophenyl)ethylphosphineoxide; bis-(4-aminophenyl)-N-butylamine; N,N-bis-(4-aminophenyl)-N-methylamine; N-(3-aminophenyl)-4-aminobenzamide; 3,3'-diaminodiphenylmethane; 3,3'-diaminodiphenylether; 3,3'-diaminodiphenylsulfone; 2,2-bis(3-aminophenyl)propane; 1,3-bis(3-aminophenyl)propane; 3,3'-diaminodiphenylsulfide; 2,3,5,6-tetramethyl-p-phenylenediamine; 2,5-dimethyl-p-phenylenediamine; p-xylenediamine; m-xylenediamine; p-xylylenediamine; m-xylylenediamine; 2,4-diaminotoluene; 2,6-diaminotoluene; 1,2-bis(3-diaminophenyl)ethane; 1,1-bis(3-diaminophenyl)ethane; 4,4'-diaminodiphenyhexafluoropropane; 2,2-bis(4-aminophenyl)hexafluoropropane; 4,4'-diaminobenzophenone; 4,4'-diaminodiphenylsulfide; 4,4'-diaminodiphenylsulfone; 4,4'-diaminodiphenylether; 3,4'-diaminodiphenylether; 1,5-diaminonaphthalene; 2,6-diaminonaphthalene; bis(4-(4-aminophenoxy)phenyl)methane; 1,1-bis(4-(4-aminophenoxy)phenyl)ethane; 1,2-bis(4-(4-aminophenoxy)phenyl) ethane; 1,1-bis[4-(4-aminophenoxy)phenyl]propane; 2,2-bis [4-(4-aminophenoxy)phenyl]propane; 2,2-bis(4-(4-aminophenoxy)phenyl)butane; 4,4'-bis(4-aminophenoxy) diphenylketone; bis(4-(4-aminophenoxy)phenyl)sulfone; bis(4-(4-aminophenoxy)phenyl)sulfide; 1,3-bis(4-(4-aminophenoxy)phenyl)benzene; 1,4-bis(4-(4-aminophenoxy) phenyl)benzene; 4,4'-bis(4-(4-aminophenoxy)phenyl)biphenyl; 1,2-bis(4-(4-aminophenoxy)phenyl)cyclohexane; 1,3-bis(4-(4-aminophenoxy)phenyl)cyclohexane; 1,4-bis(4-(4-aminophenoxy)phenyl)cyclohexane; bis(4-(4-aminophenoxy)phenyl)hexafluoropropane; 2,2-bis(4-(2-aminophenoxy)phenyl)hexafluoropropane; 2,2-bis(4-(3-aminophenoxy)phenyl)hexafluoropropane; 2,2-bis(4-(3-carbamoyl-4-aminophenoxy)phenyl)hexafluoropropane; 2,2-bis-(3-sulfamoyl-4-aminophenyl)hexafluoropropane; 2,2-bis-(3-carboxy-4-aminophenyl)hexafluoropropane; 2,2-bis(4-(3-sulfamoyl-4-aminophenoxy)phenyl)hexafluoropropane; 2,2-bis(4-(3-carboxy-4-aminophenoxy)phenyl) hexafluoropropane; 1,3-bis(2,2-{4-(4-aminophenoxy) phenyl}hexafluoroisopropyl)benzene; 2,4-bis(β-amino-t-butyl)toluene; bis(p-β-methyl-γ-aminopentyl)benzene; bisp-(1,1-dimethyl-5-aminopentyl)benzene; bis(p-β-amino-t-butylphenyl)ether; bis(4-aminobenzoloxy)methane; bis(4-aminobenzoloxy)ethane; bis(4-aminobenzoloxy)propane; bis(4-aminobenzoloxy)cyclohexane; p-phenylenediamine; m-phenylenediamine; o-phenylenediamine; 4,4'-diaminobiphenyl; 4,4'-diaminodiphenylmethane; 4,4'-diaminodiphenylethane; 4,4'-diaminobiphenyl; 3,3'-dimethylbenzidine; 1,3-bis(4-aminophenyl)propane; 2,2-bis(4-aminophenyl) propane; bis(4-amino-3-methylphenyl)methane; bis(4-amino-2-methylphenyl)methane; 1,2-bis(4-amino-3-methylphenyl)ethane; 1,3-bis(4-amino-3-methylphenyl)propane; 1,2-bis(4-amino-2-methylphenyl)ethane; 1,3-bis(4-amino-2-methylphenyl)propane; 1,4-bis(4-aminophenyl)benzene; 1,4-bis((4-aminophenyl)methyl)benzene; 1,4-bis((3-aminophenyl)methyl)benzene; 1,4-bis((4-aminophenyl)ethyl) benzene; 1,4-bis((3-aminophenyl)ethyl)benzene; 1,4-bis((4-amino-3-methyl-phenyl)methyl)benzene; 1,4-bis((4-amino- 3-methyl-phenyl)ethyl)benzene; 4,4'-(4-aminophenyl) biphenyl; bis-((4-(4-aminophenylmethyl)phenyl)methane; bis-((4-(4-aminophenylmethyl)phenyl)ethane; bis-((4-(3-aminophenylmethyl)phenyl)methane; bis((4-(3-aminophenylmethyl)phenyl)ethane; 2,2-bis-((4-(4-aminophenylmethyl)phenyl)propane; and 2,2-bis-((4-(3-aminophenylmethyl)phenyl)propane.

Another example of the polymers obtained by using the compound (1-4) as a monomer includes the polymer obtained by reacting the compound (1-4) in which $Y^4$ is a group represented by the formula (a-3) with the compound (1-4) in which $Y^4$ is a group represented by the formula (a-4).

Another example of the polymers obtained by using the compound (1-4) as a monomer includes the polymer obtained by reacting the compound (1-4) in which $Y^4$ is a group represented by the formula (a-4) with the compound (1-4) in which $Y^4$ is a group represented by the following formula (a-5).

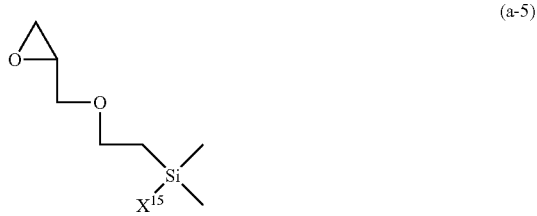

(a-5)

$X^{15}$ in the formula (a-5) represents an alkyl having 1 to 4 carbon atoms or unsubstituted phenyl.

Another example of the polymers obtained by using the compound (1-4) as a monomer includes the polymer obtained by reacting the compound (1-4) in which $Y^4$ is a group represented by the formula (a-4) with the following compound (9-1).

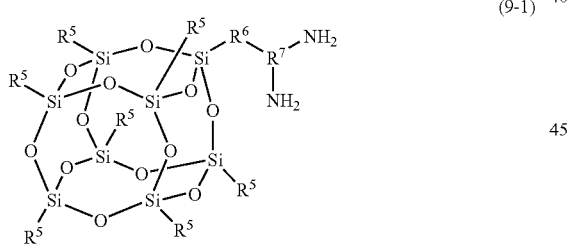

(9-1)

In the formula (9-1), $R^5$ represents an alkyl having 1 to 20 carbon atoms, alkenyl having 2 to 20 carbon atoms, or aryl having 6 to 20 carbon atoms, and optional —$CH_2$— may be replaced by oxygen, and optional hydrogen may be replaced by halogen. Preferable examples of $R_5$ include a fluoroalkyl or fluoroaryl, and more preferable examples of $R_5$ include trifluoromethyl, 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl, perfluoro-1H,1H,2H,2H-tetradecyl, pentafluorophenyl, and 4-fluorophenyl.

$R^6$ represents a single bond or a divalent organic group having 1 to 15 carbon atoms.

$R^7$ represents a trivalent organic group having 1 to 15 carbon atoms, and preferable examples thereof include benzenetriyl and trifluorobenzenetriyl.

The compound of the formula (9-1) can be easily synthesized by means of an conventional organic chemistry approach. For example, a typical synthesis method comprising: circularizing the commercially available incompletely condensed silsesquioxane derivative (a) with a trichlorosilane derivative having an appropriate functional group; reacting the obtained compound (b) with an optional organic group having two functional groups which can be converted into amino groups (specifically, a nitro group and the like); and converting the resultant the functional groups in (c) into an amino group. A synthesis example in the case where $R^6$ in the formula (9-1) represents an ester bond is shown below.

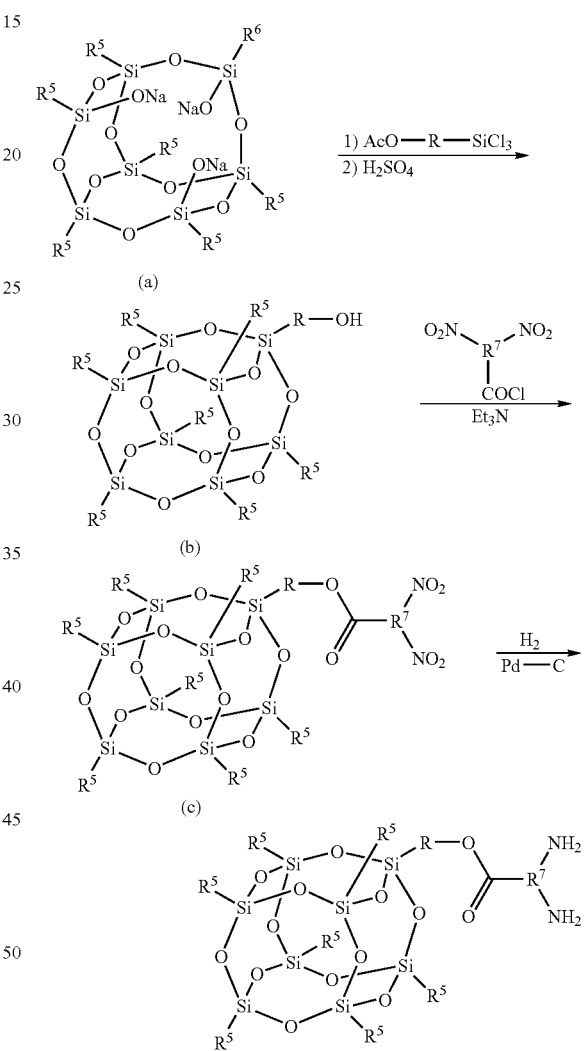

Organic solvents to be used in the polymerization reaction between two kinds of the compounds (1-4), the reaction between the compound (1-4) and carbonate, diamine or the compound (9-1) are not particularly limited as long as the solvent does not inhibit the progress of a polymerization reaction and can dissolve a monomer and the produced polymer. Specific examples of the solvents include: toluene; xylene; mesitylene; cyclopentanone; cyclohexanone; N-methyl-2-pyrrolidone; formamide; N,N-dimethylformamide; N,N-dimethylacetamide; N,N-dimethylimidazolidinone; dimethyl sulfoxide; hexamethylphosphoric triamide; sulfolane; γ-butyrolactone; tetrahydrofuran; dioxane; dichloromethane; chloroform; and 1,2-dichloroethane. Of those, cyclohexanone, N-methyl-2-pyrrolidone, N,N-dimethylacetamide, and tetrahydrofuran are preferable. Each of those solvents may be used alone, or two or more of them may be used as a mixture.

A polymer obtained by using the above-described compound (1-0), (1-1), (1-2), or (1-4) is useful as an optical waveguide material.

The term "optical waveguide material" means, for example, a material having a function of guiding a light signal trapped in a specific region from an incidence end to an emission end in an optical functional device such as an optical fiber or optical wiring.

An optical waveguide can be produced according to known methods (JP2005-010770A, JP2005-029652A, JP2004-182909A, or the like). For example, the optical waveguide is produced by the following procedures. At first, a polymer to be used for an optical clad material is applied onto a substrate to form a film. Then, a polymer for an optical core material is applied, and then an etching mask is mounted on the resultant application layer. After that, a waveguide pattern is formed by means of a photolithography approach. An organic photoresist, a metal, or the like is used as a material for the etching mask. Next, the optical core layer is subjected to reactive ion etching over the etching mask, and thereby, a desired waveguide pattern can be formed. This method is particularly effective in producing a single mode-type optical waveguide. JP09-329721A describes a method of producing an optical waveguide to be used for an optical waveguide-type reduced image sensor. The above-described polymers are suitable for the preparation of such optical waveguide.

EXAMPLES

The present invention will be described more specifically by referring to examples. However, the present invention is not limited to these examples.

Hereinafter, a testing method in the examples will be described.

(1) Viscosity: The viscosity of a reaction liquid was measured with a rotating viscometer.
  Apparatus: VISCONIC ELO manufactured by Tokyo Keiki Co., Ltd.
  Temperature 25° C.

(2) Molecular weight: A number average molecular weight (Mn) and a weight average molecular weight (Mw) were measured by means of GPC.
  Apparatus: JASCO GULLIVER 1500 manufactured by JASCO (intelligent differential refractometer RI-1530)
  Column: Four columns, G4000 HXL, G3000 HXL, G2500 HXL, and G2000 HXL manufactured by TOSOH CORPORATION, were connected in this order and used.
  Column temperature: 40° C.
  Developing solvent: THF
  Flow rate: 1 ml/min
  Standard substance: Polystyrene having a known molecular weight (3) Thickness measurement
  Apparaus: WYKO NT1100 manufactured by Veeco
  Film Thickness Measurement System with sensing pin, manufactured by Tencor (4) Measurement of refractive index
  Apparatus: DR-M2 manufactured by ATAGO CO., LTD., Abbe refractometer
  Wavelength: 589 nm (5) Measurement of weak absorption spectrum
  Apparatus: MAC-1 manufactured by JASCO
  Measurement wavelength 900 to 1,700 nm
  Data fetching interval: 1 nm
  Measurement temperature 25° C.

(6) Measurement of weight loss
  Apparatus: SSC/5200 (TG/DTA220) manufactured by Seiko Instruments Inc.
  Rate of temperature increase 10° C./min (7) Measurement of glass transition temperature
  Apparatus: DMA (UBM) DVE-V4 FT Rheospectrer
  Rate of temperature increase 5° C./min, frequency 10 Hz
  In each of the chemical formulae in the examples, Me represents methyl, Ph represents phenyl, and i-Bu represents isobutyl.

(8) Measurement of refractive index (1.55 μl)
  A simple waveguide having breadth of 100 μm was prepared by dicing, and cutback measurement was performed by prismcoupling method. The length of the waveguide was 5 cm, and 1 cm, respectively.
  Measurement device: PC2010 PRISMcoupler (Metricon)
  Measurement wave length: 1.55 μl
  Measurement mode: TE and TM mode
  Measurement temperature: 26° C.

(9) Measurement of light loss
  Light loss was determined by cutback measurement.
  Measurement device: Optical power meter Q8221 (Advantest)
  Laser source: laser source unit Q81212 (Advantest)
  Measurement wave length: 1.55 μl
  Incident fiber: single mode fiber
  Light receiver: PCF (core) (core diameter: 200 μm□.)
  Core adjustment: adjusted for maximum light output
  Measurement mode: TE and TM mode
  Measurement temperature: room temperature (25° C.)

Example 1

12.1 g of the compound (7) and 6.51 g of the compound (8) were dissolved into 74.3 g of toluene to obtain a solution having a solid concentration of 20 wt %. After the solution had been heated to 80° C. with stirring, 7 μl of Karstedt catalyst was added to the solution, and followed by stirring at the temperature for 140 minutes. The resultant reaction liquid had a viscosity of 3.0 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 5,700 and Mw of 32,900.

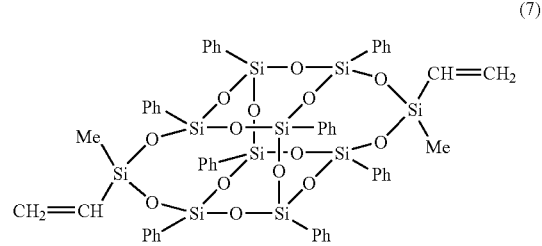

(7)

-continued

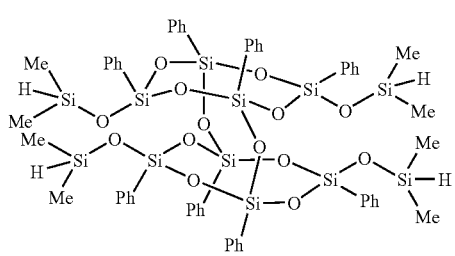
(8)

Example 2

2.1 g of the compound (7) and 7.4 g of the compound (9) were dissolved into 77.9 g of toluene to obtain a solution having a solid concentration of 20 wt %. After the solution had been heated to 80° C. with stirring, 7 µl of the Karstedt catalyst was added to the solution, and followed by stirring at the temperature for 90 minutes. The resultant reaction liquid had a viscosity of 2.46 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 8,400 and Mw of 38,400.

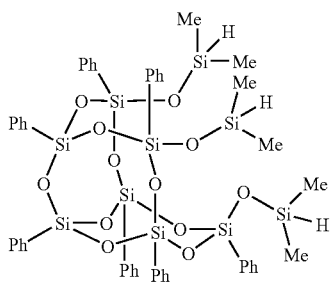
(9)

Example 3

13.3 g of the compound (10) and 7.4 g of the compound (9) were dissolved into 82.8 g of toluene to obtain a solution having a solid concentration of 20 wt %. After the solution had been heated to 80° C. with stirring, 7 µl of Karstedt catalyst was added to the solution, and followed by stirring at the temperature for 160 minutes. The resultant reaction liquid had a viscosity of 2.3 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 6,300 and Mw of 30,100.

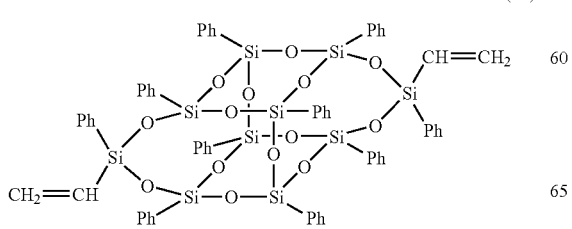
(10)

Example 4

12.1 g of the compound (7) and 7.6 g of the compound (11) were dissolved into 78.8 g of toluene to obtain a solution having a solid concentration of 20 wt %. After the solution had been heated to 80° C. with stirring, 7 µl of Karstedt catalyst was added to the solution, and followed by stirring at the temperature for 100 minutes. The resultant reaction liquid had a viscosity of 2.0 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 5,900 and Mw of 24,200.

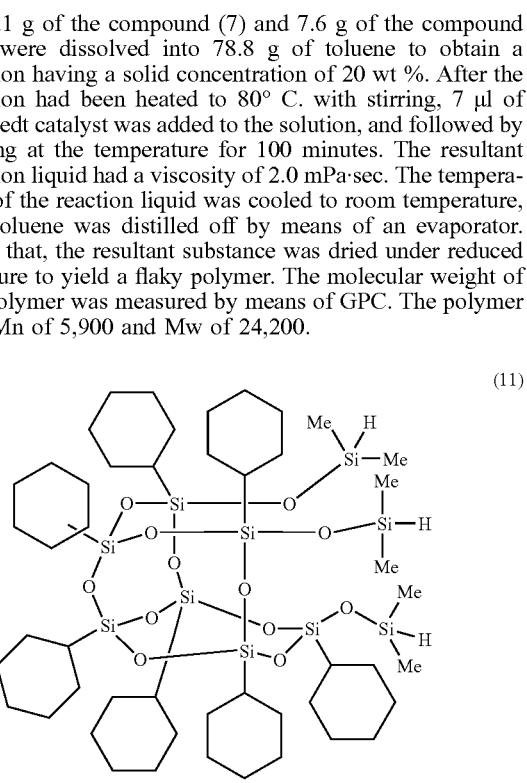
(11)

Example 5

12.1 g of the compound (7) and 8.3 g of the compound (12) were dissolved into 81.6 g of toluene to obtain a solution having a solid concentration of 20 wt %. After the solution had been heated to 80° C. with stirring, 7 µl of Karstedt catalyst was added to the solution, and followed by stirring at the temperature for 110 minutes. The resultant reaction liquid had a viscosity of 2.2 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 3,400 and Mw of 29,000.

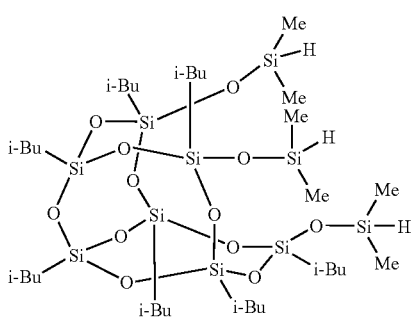
(12)

Example 6

12.1 g of the compound (7) and 6.7 g of the compound (13) were dissolved into 74.9 g of toluene to obtain a solution having a solid concentration of 20 wt %. After the solution had been heated to 80° C. with stirring, 7 µl of Karstedt catalyst was added to the solution, and followed by stirring at the temperature for 90 minutes. The resultant reaction liquid had a viscosity of 2.7 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 4,900 and Mw of 40,800.

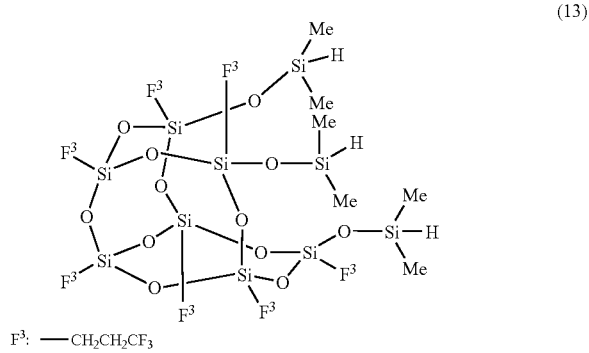

(13)

F³: —CH₂CH₂CF₃

Example 7

12.1 g of the compound (7), 3.3 g of the compound (8), and 3.8 g of the compound (9) were dissolved into 95.4 g of toluene to obtain a solution having a solid concentration of 20 wt %. After the solution had been heated to 80° C. with stirring, 7 µl of Karstedt catalyst was added to the solution, and followed by stirring at the temperature for 100 minutes. The resultant reaction liquid had a viscosity of 3.2 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 6,300 and Mw of 52,600.

Example 8

12.1 g of the compound (7), 5.5 g of the compound (9), and 2.5 g of the compound (14) were dissolved into 80.4 g of toluene to obtain a solution having a solid concentration of 20 wt %. After the solution had been heated to 80° C. with stirring, 7 µl of Karstedt catalyst was added to the solution, and followed by stirring at the temperature for 80 minutes. The resultant reaction liquid had a viscosity of 2.8 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 5,100 and Mw of 43,200.

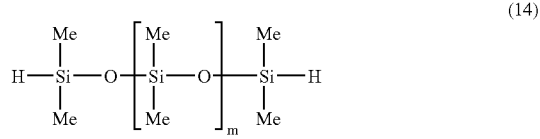

(14)

Example 9

13.3 g of the compound (10) and 8.66 g of the compound (15) were dissolved into 110 g of toluene to obtain a solution having a solid concentration of 20 wt %. After the solution had been heated to 80° C. with stirring, 7 µl of Karstedt catalyst was added to the solution, and followed by stirring at the same temperature for 180 minutes. The resultant reaction solution had a viscosity of 3.5 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 9,000 and Mw of 39,000.

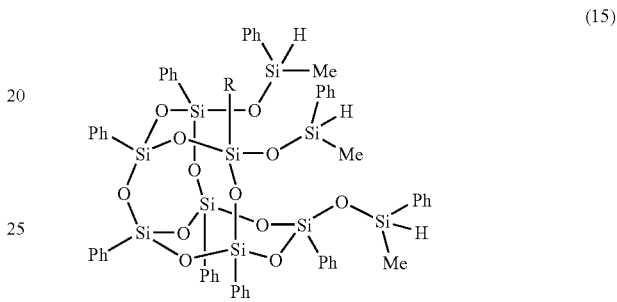

(15)

Example 10

13.3 g of the compound (10) and 9.9 g of the compound (16) were dissolved into toluene (116 g) to obtain a solution having a solid concentration of 20 wt %. After the solution had been heated to 80° C. with stirring, 7 µl of Karstedt catalyst was added to the solution, and followed by stirring at the same temperature for 240 minutes. The resultant reaction solution had a viscosity of 3.2 mPa·sec. The temperature of the reaction liquid was cooled to room temperature, and toluene was distilled off by means of an evaporator. After that, the resultant substance was dried under reduced pressure to yield a flaky polymer. The molecular weight of the polymer was measured by means of GPC. The polymer had Mn of 8,300 and Mw of 34,700.

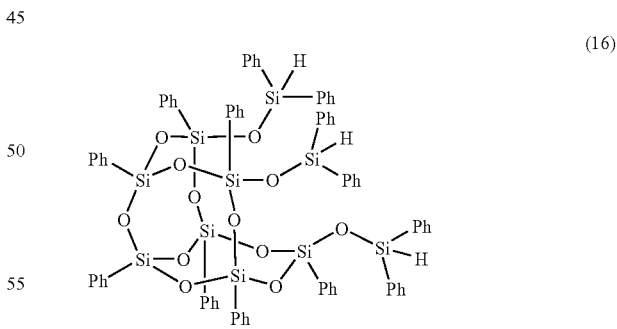

(16)

Example 11

The refractive index of each of the polymers prepared in Examples 1 to 8 was measured.

Each of the polymers was dissolved into propylene glycol monomethyl acetate at room temperature so that a polymer solution has a solid concentration of 25 wt %. A thin film was formed by using the solution on a glass plate by means of a spin coating method. The baking procedures involved:

heating at 80° C. for 3 minutes after the spin coating; heating at 150° C. for 1 hour; increasing the temperature up to 250° C. over 20 minutes; and heating at 250° C. for 1 hour. A thickness after the baking was about 1 to 1.2 μm, so a flat and transparent thin film with no film crack was obtained. As a result, it was found that a refractive index could be approximately controlled by changing a composition, and a sufficient difference in refractive index required for an optical waveguide material was achieved.

TABLE 1

| Example | Polymer Component | | | Refractive index (thin film) 589 nm | Difference in refractive index (%) |
|---|---|---|---|---|---|
| | Compound A | Compound B | Compound C | | |
| 1 | 7 | 8 | — | 1.5470 | 0.00 |
| 2 | 7 | 9 | — | 1.5473 | 0.02 |
| 3 | 10 | 9 | — | 1.5621 | 0.98 |
| 4 | 7 | 11 | — | 1.5164 | −1.98 |
| 5 | 7 | 12 | — | 1.5100 | −2.39 |
| 6 | 7 | 13 | — | 1.4935 | −3.46 |
| 7 | 7 | 8 | 9 | 1.5477 | 0.05 |
| 8 | 7 | 9 | 14 | 1.5347 | −0.80 |

Difference in refractive index: value with respect to the polymer in Example 1

Example 12

The dielectric constant of each of the polymers prepared in Examples 1 to 8 was measured.

A measurement sample was prepared in the same manner as in Example 11 except that the glass plate was changed to chroming glass.

TABLE 2

| Example | Polymer Component | | | Relative dielectric constant (1 kHz) |
|---|---|---|---|---|
| | Compound A | Compound B | Compound C | |
| 1 | 7 | 8 | — | 2.78 |
| 2 | 7 | 9 | — | 2.78 |
| 3 | 10 | 9 | — | 2.80 |
| 4 | 7 | 11 | — | 2.90 |
| 5 | 7 | 12 | — | 3.20 |
| 6 | 7 | 13 | — | 2.66 |
| 7 | 7 | 8 | 9 | 2.71 |
| 8 | 7 | 9 | 14 | 2.67 |

Example 13

The TGA of each of the polymers prepared in Examples 1 to 8 was measured.

Each of the polymers was dissolved into propylene glycol monomethyl acetate at room temperature so that a polymer solution has a solid concentration of 50 wt %. The solution was applied onto a polyimide film (Kapton) by means of an applicator having a gap of 300 μm, and followed by heat treatment. The baking procedures involved: leaving at room temperature for 20 minutes after the application; heating at 150° C. for 1 hour; increasing the temperature up to 250° C. over 20 minutes; and heating at 250° C. for 1 hour. A thickness after the baking was about 70 to 80 μm, so a flat and transparent thin film with no film crack was obtained. The film was defined as a TGA sample.

TABLE 3

| Example | Polymer Component | | | Weight loss starting temperature (° C.) | Temperature at which weight is lost by 5% (° C.) |
|---|---|---|---|---|---|
| | Compound A | Compound B | Compound C | | |
| 1 | 7 | 8 | — | 260 | 375 |
| 2 | 7 | 9 | — | 260 | 380 |
| 3 | 10 | 9 | — | 270 | 380 |
| 4 | 7 | 11 | — | 210 | 315 |
| 5 | 7 | 12 | — | 210 | 325 |
| 6 | 7 | 13 | — | 260 | 355 |
| 7 | 7 | 8 | 9 | 260 | 375 |
| 8 | 7 | 9 | 14 | 270 | 405 |

Example 14

Each of the polymer films prepared in Examples 1 to 8 was subjected to dynamic viscoelasticity measurement (DMA) for the evaluation of the polymer film for elasticity and heat resistance. The film prepared in Example 13 was used as a sample. This measurement allows the determination of the temperature dependence of a storage elastic modulus (E') and a glass transition temperature. The storage elastic modulus can be used as an index for hardness at a temperature equal to or lower than the glass transition temperature, and can be used for evaluation for heat resistance (shape retentivity) at a high temperature equal to or higher than the glass transition temperature. The film prepared in Example 13 was subjected to DMA, and dynamic storage elastic moduli at 25° C. and 150° C. were used as index for hardness and heat resistance, respectively. Furthermore, the peak temperature of tanδ was defined as the glass transition temperature (Tg). The polymer shows a small reduction in E' even above the glass transition temperature, and causes no flow, so it maintains its shape up to a high temperature. Accordingly, it was found that the polymer has good heat resistance (FIG. 1).

TABLE 4

| Example | Polymer Component | | | Tg (° C.) | Storage elastic modulus E' (GPa) 25° C./150° C. |
|---|---|---|---|---|---|
| | Compound A | Compound B | Compound C | | |
| 1 | 7 | 8 | — | 170 | 1.88/0.62 |
| 2 | 7 | 9 | — | 145 | 1.85/0.30 |
| 3 | 10 | 9 | — | 150 | 2.21/0.84 |
| 4 | 7 | 11 | — | 146 | 1.34/0.34 |
| 5 | 7 | 12 | — | 110 | 1.11/0.18 |
| 6 | 7 | 13 | — | 95 | 1.34/0.11 |
| 7 | 7 | 8 | 9 | 155 | 1.74/0.42 |
| 8 | 7 | 9 | 14 | 145 | 0.96/0.01 |

Example 15

The solvent resistance of the polymer prepared in Example 7 was measured. A sample formed into a film on a glass substrate in Example 11 was used. Two kinds of solvents, that is, propylene glycol monomethyl ether (PG-MEA) and dimethylacetamide (DMAC), were used. After the sample had been immersed in a solvent heated to 80° C. for 60 minutes, the solvent was blown and removed by means of an air gun. A thickness immediately after the blow and the thickness of the sample after drying at 100° C. for 30 minutes were compared for determining a swelling ratio and a film reduction. Upon comparison among a thickness before a treatment, a thickness immediately after the treatment, and a thickness after drying, the same site was subjected to accurate measurement. The sample showed no change in external appearance against each of both solvents. In addition, although the sample swelled by around 6%, the sample showed nearly no film reduction, so it was found that it had good solvent resistance.

TABLE 5

| | Number of substrates n | Swelling ratio % | Film reduction % | Evaluation Swelling/film reduction |
|---|---|---|---|---|
| PGMEA treatment | 1 | 6.4 | 1.0 | Δ/o |
| | 2 | 6.9 | 1.3 | Δ/o |
| DMAC treatment | 1 | 5.0 | 0.8 | Δ/o |
| | 2 | 3.8 | 0.8 | Δ/o |
| Untreated | 1 | — | 0.1 | o/o |

Example 16

Figure 2:
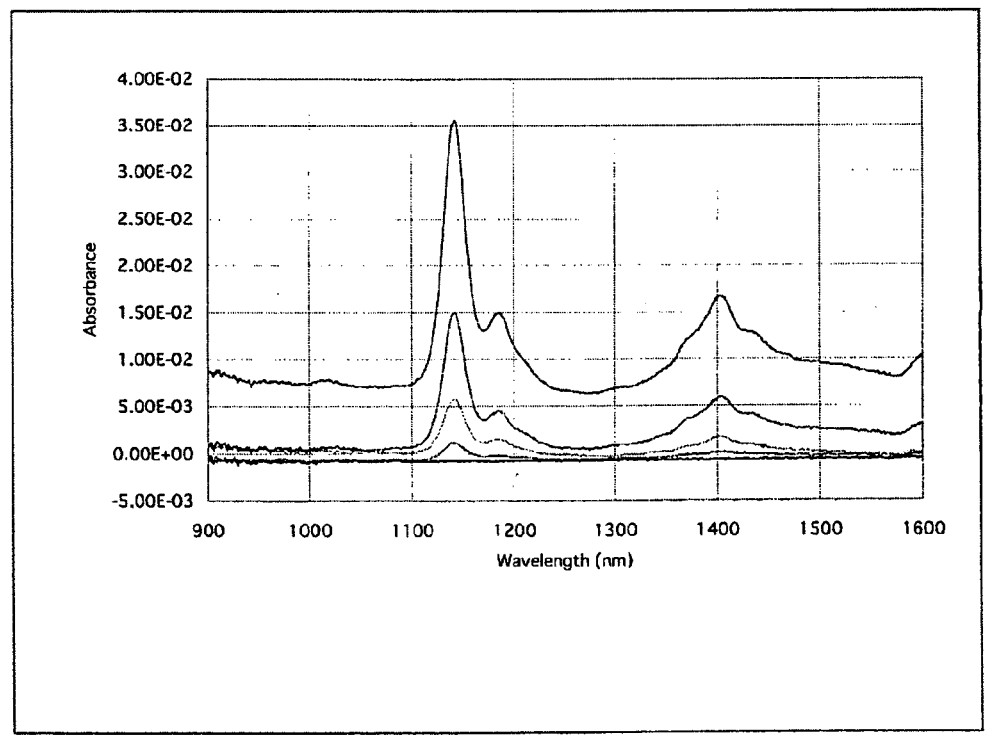
FIG. 2 shows the results of the near infrared absorption spectrum of the polymer.

The near infrared absorption spectrum of the sample prepared in Example 7 was measured. The sample was produced in the same manner as in Example 13 except that a polymer concentration and an applicator gap were changed to adjust the thickness. The results calculated by subtracting the spectrum of the standard sample from that of the sample having each thickness were shown in FIG. 2. Absorption peaks were observed at a wavelength of about 1,150 nm and a wavelength of about 1,400 nm. On the other hand, no large absorption was observed in a wavelength region from 1,300 nm to 1,550 nm as a communication wavelength.

TABLE 6

| Sample Name | Sample thickness (cm) | Difference in thickness with standard sample (cm) | Absorbance |
|---|---|---|---|
| 1 | 0.0091 | — | 0.00058 |
| 2 | 0.0119 | 0.0028 | 0.00026 |
| 3 | 0.0191 | 0.0100 | 0.00018 |
| 4 | 0.0336 | 0.0245 | 0.00218 |
| 5 | 0.0585 | 0.0494 | 0.00860 |

Absorbance observed in a wavelength region of 1,300 nm

TABLE 7

| Sample Name | Sample thickness (cm) | Difference in thickness with standard sample (cm) | Absorbance |
|---|---|---|---|
| 1 | 0.0091 | — | 0.00070 |
| 2 | 0.0119 | 0.0028 | 0.00048 |
| 3 | 0.0191 | 0.0100 | 0.00024 |
| 4 | 0.0336 | 0.0245 | 0.00096 |
| 5 | 0.0585 | 0.0494 | 0.00694 |

Absorbance observed in a wavelength region of 1,550 nm

Optical losses at wavelengths of 1,300 nm and 1,550 nm were determined from a relationship between a difference in thickness and an absorbance.

TABLE 8

| Wavelength (nm) | Optical loss (dB/cm) |
|---|---|
| 1300 | 1.7 |
| 1550 | 1.4 |

Example 17

The refractive index at 1.55 μm of each of the polymers prepared in Examples 3, 7, 8, 9 and 10 was measured.

The mixture of equal amounts of propyleneglycol monomethylacetate and ethyleneglycol-n-butyleteracetate were used as solvent. A polymer solution having a solid concentration of 50 wt % was prepared, and used to form a thin film on a 4-inch silicon wafer by means of a spin coating method. Then, the film was subjected to a heat treatment at 80° C. for 3 minutes; then heating at 150° C. for 1 hour; increasing the temperature up to 250° C. over 20 minutes; and followed by heating at 250° C. for 1 hour. A thickness after the baking was about 8 to 10 μm, so a flat and transparent thin film with no film crack was obtained. These films were used for measurement of refractive index. It was found that these materials have very low degree of birefringence.

TABLE 9

| | Polymer Component | | | Refractive | |
|---|---|---|---|---|---|
| Example | Compound A | Compound B | Compound C | index (thin film) 589 nm | Difference in refractive index (%) |
| 1 | 7 | 8 | — | 1.5470 | 0.00 |
| 2 | 7 | 9 | — | 1.5473 | 0.02 |
| 3 | 10 | 9 | — | 1.5621 | 0.98 |
| 4 | 7 | 11 | — | 1.5164 | −1.98 |
| 5 | 7 | 12 | — | 1.5100 | −2.39 |
| 6 | 7 | 13 | — | 1.4935 | −3.46 |
| 7 | 7 | 8 | 9 | 1.5477 | 0.05 |
| 8 | 7 | 9 | 14 | 1.5347 | −0.80 |

Difference in refractive index: value based on the polymer in Example 1

Example 18

Light loss was measured for the samples prepared in Examples 3, 7, 8, 9 and 10. A core layer having a thickness of 15-17 μm was prepared over silicon wafer coated with 4-inch SiO$_2$ film, and baked in the same manner as in Example 17. The film thickness was adjusted by polymer concentration and spin coat condition. For the sample of Example 8, a single layer was prepared, baked, and used for light loss measurement. For the samples of Examples 3, 7, 9 and 10, a small clad layer with low refractive index having a thickness of 15-17 μm was prepared over the core layer, and baked, and used for light loss measurement. As a result, a flat sample with no clack was obtained, even if the thickness is 15-17 μm. Accordingly, in Examples 9 and 10, it is possible to decrease light loss significantly by using the compounds (15) and (16). Furthermore, it is clearly understood that light loss can be decreased by using the compounds (17) and (18) in place of the compounds (15) and (16).

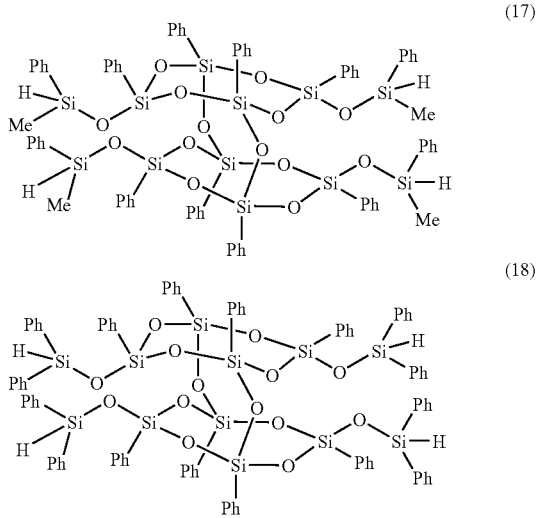
(17)

(18)

TABLE 10

| | Polymer composition | | | refractive index 1.55 μm | | | light loss | |
|---|---|---|---|---|---|---|---|---|
| Examples | Compound A | Compound B | Compound C | TE | TM | Birefringence | dB/cm | clad |
| 3 | 10 | 9 | | 1.5375 | 1.5367 | 0.0008 | 0.47 | Example 7 |
| 7 | 7 | 8 | 9 | 1.5260 | 1.5249 | 0.0011 | 0.57 | Example 8 |
| 8 | 7 | 9 | 14 | 1.5202 | 1.5194 | 0.0008 | 0.75 | no clad |
| 9 | 10 | 15 | | 1.5490 | 1.5482 | 0.0008 | 0.38 | Example 3 |
| 10 | 10 | 16 | | 1.5605 | 1.5597 | 0.0008 | 0.30 | Example 9 |

INDUSTRIAL APPLICABILITY

According to the present invention, a high-quality optical waveguide material can be provided. An optical component composed of the material of the present invention is excellent in heat resistance, solvent resistance, and crack resistance. In addition, the component shows small near infrared absorption. In particular, the component is advantageously applicable to an optical waveguide-type component.

The invention claimed is:

1. An optical waveguide comprising a polymer obtained by using a silsesquioxane derivative represented by the formula (1-0)

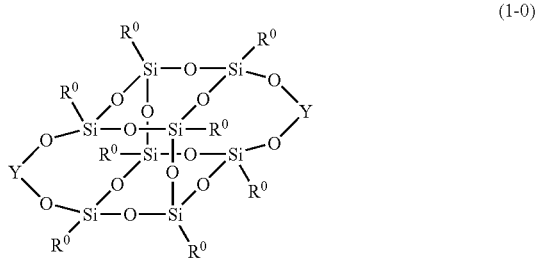

(1-0)

wherein $R^0$ independently represents:
hydrogen,
alkyl having 1 to 40 carbon atoms in which hydrogen may optionally be replaced by fluorine and —CH$_2$— may optionally be replaced by —O—, —CH=CH—, cycloalkylene, or cycloalkenylene, aryl in which hydrogen may optionally be replaced by halogen, or by alkyl having 1 to 20 carbon atoms in which hydrogen may optionally be replaced by fluorine and —CH$_2$— may optionally be replaced by —O—, —CH=CH—, cycloalkylene, or phenylene, or arylalkyl in which hydrogen in the aryl may optionally be replaced by halogen or alkyl having 1 to 20 carbon atoms, and hydrogen in the alkylene of the arylalkyl may optionally be replaced by fluorine, and —CH$_2$— in the alkylene of the arylalkyl may optionally be replaced by —O—, —CH=CH—, or cycloalkylene, and Y is a group represented by the formula (a) or (b)

(a)

-continued

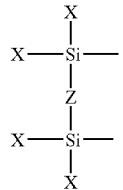
(b)

wherein X in each of the formulae (a) and (b) independently represents a group selected from hydrogen, chlorine, a group defined in the same way as $R^0$, or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and at least one of X is a reactive group selected from the above-defined group, and Z in the formula (b) represents a single bond, —O—, or —CH$_2$—.

2. The optical waveguide according to claim 1, wherein the reactive group is hydrogen bound to Si, chlorine bound to Si, or a group having any one of —CH=CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$.

3. The optical waveguide according to claim 1, comprising a polymer obtained by reacting a silsesquioxane derivative represented by the formula (1-0) with a compound having a group capable of reacting with the reactive group in the silsesquioxane derivative

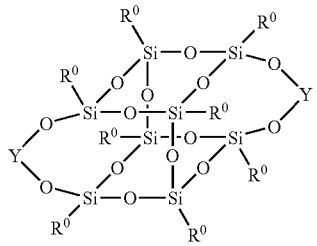
(1-0)

wherein $R^0$ independently represents hydrogen, alkyl having 1 to 40 carbon atoms in which hydrogen may optionally be replaced by fluorine and —$CH_2$— may optionally be replaced by —O—, —CH═CH—, cycloalkylene, or cycloalkenylene, aryl in which hydrogen may optionally be replaced by halogen, or by alkyl having 1 to 20 carbon atoms in which hydrogen may optionally be replaced by fluorine and —$CH_2$— may be replaced by —O—, —CH═CH—, cycloalkylene, or phenylene, or arylalkyl in which hydrogen in the aryl may optionally be replaced by halogen or alkyl having 1 to 20 carbon atoms, and hydrogen in the alkylene of the arylalkyl may optionally be replaced by fluorine, and —$CH_2$— in the alkylene of the arylalkyl may optionally be replaced by —O—, —CH═CH—, or cycloalkylene, and Y is a group represented by the formula (a) or (b)

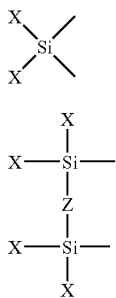
(a)

(b)

wherein X in each of the formulae (a) and (b) independently represents a group selected from hydrogen, chlorine, a group defined in the same way as $R^0$, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—, and at least one of X is a reactive group selected from the above-defined group, and Z in the formula (b) represents a single bond, —O—, or —$CH_2$—.

4. The optical waveguide according to claim 3, wherein the reactive group is hydrogen bound to Si, chlorine bound to Si, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$.

5. The optical waveguide according to claim 3, wherein:

$R^0$ independently represents an alkyl having 1 to 8 carbon atoms in which hydrogen may optionally be replaced by fluorine, and —$CH_2$— may optionally be replaced by —O— or cycloalkylene, naphthyl, phenyl in which hydrogen may optionally be replaced by halogen, methyl, or methoxy, or phenylalkyl in which hydrogen of the benzene ring may optionally be replaced by halogen, alkyl having 1 to 4 carbon atoms or methoxy, and the alkylene in the phenylalkyl has 1 to 8 carbon atoms, and —$CH_2$— in the alkylene in the phenylalkyl may optionally be replaced by —O— or cycloalkylene;

in each of the formulae (a) and (b), at least one of X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining X is a group defined in the same way as $R^0$; and Z in the formula (b) represents —O—.

6. The optical waveguide according to claim 3, wherein:

all of the $R^0$ are the same group selected from alkyl having 1 to 8 carbon atoms, in which hydrogen may optionally be replaced by fluorine, and —$CH_2$— may optionally be replaced by —O— or a cycloalkylene, naphthyl, phenyl in which hydrogen may optionally be replaced by halogen, methyl, or methoxy, and phenylalkyl in which hydrogen of the benzene ring may optionally be replaced by halogen, alkyl having 1 to 4 carbon atoms or methoxy, and alkylene in the phenylalkyl has 1 to 8 carbon atoms, and —$CH_2$— in the alkylene in the phenylalkyl may optionally be replaced by —O— or cycloalkylene;

in each of the formulae (a) and (b), one of the X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining X is a group defined in the same way as $R^0$; and Z in the formula (b) represents —O—.

7. The optical waveguide according to claim 3, wherein:

all of the $R^0$ are the same group selected from unsubstituted phenyl, cyclopentyl, and cyclohexyl;

in each of the formulae (a) and (b), one of the X is a reactive group selected from hydrogen bound to Si, chlorine bound to Si, and a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining X is a group defined in the same way as $R^0$; and Z in the formula (b) represents —O—.

8. The optical waveguide according to claim 3, comprising a polymer obtained by reacting a silsesquioxane derivative represented by the formula (1-1) with a compound having at least two Si—H groups

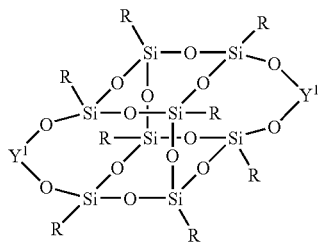
(1-1)

wherein R independently represents
hydrogen,
alkyl having 1 to 40 carbon atoms in which hydrogen may optionally be replaced by fluorine and —$CH_2$— may optionally be replaced by —O—, —CH=CH—, cycloalkylene, or cycloalkenylene,
aryl in which hydrogen may optionally be replaced by halogen, or by alkyl having 1 to 20 carbon atoms in which hydrogen may optionally be replaced by fluorine and —$CH_2$— may optionally be replaced by —O—, —CH=CH—, cycloalkylene, or phenylene, or
arylalkyl in which hydrogen in the aryl may optionally be replaced by halogen or alkyl having 1 to 20 carbon atoms, and hydrogen in the alkylene of the arylalkyl may optionally be replaced by fluorine, and —$CH_2$— in the alkylene of the arylalkyl may optionally be replaced by —O—, —CH=CH—, or cycloalkylene, and
$Y^1$ is a group represented by the formula (a-1) or (b-1)

(a-1)

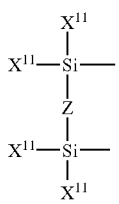
(b-1)

wherein, in each of the formulae (a-1) and (b-1), at least one of the $X^{11}$ is alkenyl-containing group, and the remaining $X^{11}$ independently represents a hydrogen, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—, and
Z in the formula (b-1) represents a single bond, —O—, or —$CH_2$—.

9. The optical waveguide according to claim 8, comprising a polymer obtained by reacting a silsesquioxane derivative represented by the formula (1-1) with at least one of the compounds selected from the group consisting of a silsesquioxane derivative represented by the formula (1-2), a compound represented by the formula (2-1), a compound represented by the formula (3-1), a compound represented by the formula (4-1), a compound represented by the formula (5-1), and a compound represented by the formula (6-1)

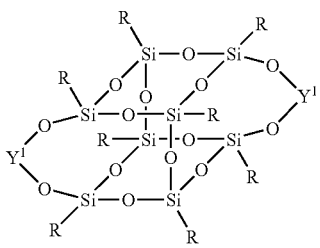
(1-1)

wherein, in the formula (1-1), R independently represents
hydrogen,
alkyl having 1 to 40 carbon atoms in which hydrogen may optionally be replaced by fluorine and —$CH_2$— may optionally be replaced by —O—, —CH=CH—, cycloalkylene, or cycloalkenylene,
aryl in which hydrogen may optionally be replaced by halogen, or with alkyl having 1 to 20 carbon atoms in which hydrogen may optionally be replaced by fluorine and —$CH_2$— may optionally be replaced by —O—, —CH=CH—, cycloalkylene, or phenylene, or
arylalkyl in which hydrogen in the aryl may optionally be replaced by halogen or alkyl having 1 to 20 carbon atoms, and hydrogen in the alkylene of the arylalkyl may optionally be replaced by fluorine, and —$CH_2$— in the alkylene of the arylalkyl may optionally be replaced by —O—, —CH=CH—, or cycloalkylene, and
$Y^1$ is a group represented by the formula (a-1) or (b-1)

(a-1)

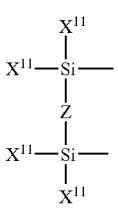
(b-1)

wherein, in each of the formulae (a-1) and (b-1), at least one of $X^{11}$ is an alkenyl-containing group, and the remaining $X^{11}$ independently represents hydrogen, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —$NH_2$, —CN, and —O—,
Z in the formula (b-1) represents a single bond, —O—, or —$CH_2$—

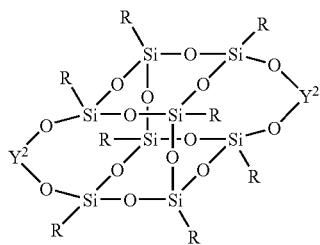 (1-2)

wherein, in the formula (1-2), R is a group defined in the same way as the R in the formula (1-1), and $Y^2$ is a group represented by the formula (a-2) or the formula (b-2)

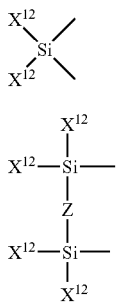

(a-2)

(b-2)

wherein, in each of the formulae (a-2) and (b-2), at least one of $X^{12}$ is hydrogen, and the remaining $X^{12}$ independently represents chlorine, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—

Z in the formula (b-2) represents a single bond, —O—, or —CH$_2$—

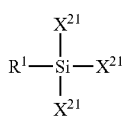 (2-1)

wherein, in the formula (2-1), $R^1$ is a group defined in the same way as R in the formula (1-1), at least two of $X^{21}$ is hydrogen, and the remaining $X^{21}$ is $R^1$

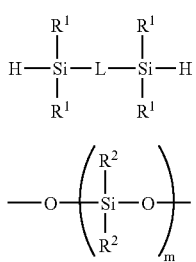 (3-1)

(c)

wherein, in the formula (3-1), $R^1$ is a group defined in the same way as R in the formula (1-1), and L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene, or a group represented by the formula (c); in the formula (c), $R^2$ is a group defined in the same way as $R^1$, and m represents an integer of 1 to 30

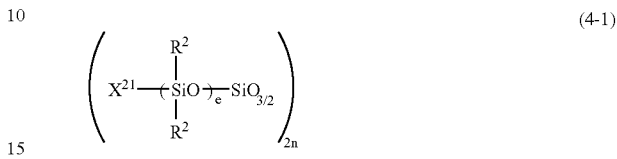 (4-1)

wherein, in the formula (4-1), $R^2$ is a group defined in the same way as $R^1$ in the formula (2-1), at least two of $X^{21}$ are hydrogen, the remaining $X^{21}$ is a group defined in the same group as R in the formula (1-1), e represents 0 or 1, and n represents an integer of 3 to 30

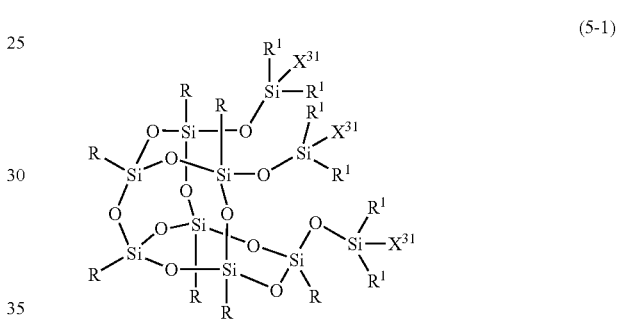 (5-1)

wherein, in the formula (5-1), each of R and $R^1$ is a group defined in the same way as R in the formula (1-1), at least two of $X^{31}$ are hydrogen, and the remaining $X^{31}$ is $R^1$

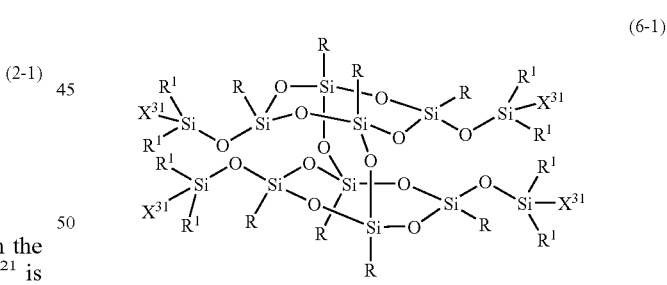 (6-1)

wherein, in the formula (6-1), each of R and $R^1$ represents a group defined in the same way as R in the formula (1-1), at least two of the $X^{31}$ are hydrogen, and the remaining $X^{31}$ is $R^1$.

10. The optical waveguide according to claim 9, wherein:
in each of the formulae (a-1) and (b-1) in the formula (1-1), at least one of $X^{11}$ is an alkenyl-containing group, and the remaining $X^{11}$ is chlorine or a group defined in the same way as R in the formula (1-1); and
in each of the formulae (a-2) and (b-2) in the formula (1-2), at least one of $X^{12}$ is hydrogen, and the remaining $X^{12}$ is chlorine or a group defined in the same way as R in the formula (1-1).

11. The optical waveguide according to claim 9, wherein:
R in the formula (1-1) independently represents
alkyl having 1 to 8 carbon atoms in which hydrogen may optionally be replaced by fluorine and —CH$_2$— may optionally be replaced by —O— or cycloalkylene, naphthyl,
phenyl in which hydrogen may optionally be replaced by halogen, methyl or methoxy, or
phenylalkyl in which hydrogen of the benzene ring may optionally be replaced by halogen, an alkyl group having 1 to 4 carbon atoms, or methoxy, and the alkylene in the phenylalkyl has 1 to 8 carbon atoms, and —CH$_2$— in the alkylene in the phenylalkyl may optionally be replaced by —O— or cycloalkylene;
in each of the formulae (a-1) and (b-1) in the formula (1-1), at least one of the $X^{11}$ is an alkenyl-containing group, and the remaining $X^{11}$ is a group defined in the same way as R in the formula (1-1);
in each of the formulae (a-2) and (b-2) in the formula (1-2), at least one of $X^{12}$ is hydrogen, and the remaining $X^{12}$ is a group defined in the same way as R in the formula (1-2); and
Z in each of the formulae (b-1) and (b-2) represents —O—.

12. The optical waveguide according to claim 9, wherein:
all of the R in the formula (1-1) are the same group selected from
alkyl having 1 to 8 carbon atoms in which hydrogen may optionally be replaced by fluorine and —CH$_2$— may optionally be replaced by —O— or cycloalkylene, naphthyl,
phenyl in which hydrogen may optionally be replaced by halogen, methyl, or methoxy, and
phenylalkyl in which hydrogen of the benzene ring may optionally be replaced by halogen, alkyl having 1 to 4 carbon atoms, or methoxy, and alkylene in the phenylalkyl has 1 to 8 carbon atoms, and —CH$_2$— in the alkylene in the phenylalkyl may optionally be replaced by —O— or cycloalkylene;
in each of the formulae (a-1) and (b-1) in the formula (1-1), one of the $X^{11}$ is alkenyl-containing group, and the remaining $X^{11}$ is a group defined in the same way as R in the formula (1-1);
in each of the formulae (a-2) and (b-2) in the formula (1-2), one of the $X^{12}$ is hydrogen, and the remaining $X^{12}$ is a group defined in the same way as R in the formula (1-2); and
Z in each of the formulae (b-1) and (b-2) represents —O—.

13. The optical waveguide according to claim 9, wherein:
all of the R in the formula (1-1) are the same group selected from unsubstituted phenyl, cyclopentyl, and cyclohexyl;
in each of the formulae (a-1) and (b-1) in the formula (1-1), at least one of $X^{11}$ is an alkenyl-containing group, and the remaining $X^{11}$ is an alkyl having 1 to 8 carbon atoms, or unsubstituted phenyl, cyclopentyl, or cyclohexyl;
in each of the formulae (a-2) and (b-2) in the formula (1-2), at least one of the $X^{12}$ is hydrogen, and the remaining $X^{12}$ is an alkyl having 1 to 8 carbon atoms, or unsubstituted phenyl, cyclopentyl, or cyclohexyl;
Z in each of the formulae (b-1) and (b-2) in the formulae (1-1) and (1-2) represents —O—;
in each of the formulae (2-1), (3-1), (5-1), and (6-1), $R^1$ is an alkyl having 1 to 8 carbon atoms, or unsubstituted phenyl, cyclopentyl, or cyclohexyl;
in the formula (2-1), at least two of the $X^{21}$ are hydrogen, and the remaining $X^{21}$ is $R^1$; and
in the formula (4-1), at least two of the $X^{21}$ is hydrogen, and the remaining $X^{21}$ is a group defined in the same way as R in the formula (1-1).

14. The optical waveguide according to claim 9, wherein:
all of the R in the formula (1-1) are the same group selected from unsubstituted phenyl, cyclopentyl, and cyclohexyl;
in each of the formulae (a-1) and (b-1) in the formula (1-1), at least one of $X^{11}$ is vinyl, aryl, or styryl, and the remaining $X^{11}$ is alkyl having 1 to 8 carbon atoms, or unsubstituted phenyl, cyclopentyl, or cyclohexyl;
in each of the formulae (a-2) and (b-2) in the formula (1-2), at least one of $X^{12}$ is hydrogen, and the remaining $X^{12}$ is alkyl having 1 to 8 carbon atoms, or unsubstituted phenyl, cyclopentyl, or cyclohexyl;
Z in each of the formulae (b-1) and (b-2) represents —O—;
in each of the formulae (2-1), (3-1), (5-1), and (6-1), $R^1$ is alkyl having 1 to 8 carbon atoms, or unsubstituted phenyl, cyclopentyl, or cyclohexyl;
in the formula (2-1), at least two of the $X^{21}$ is hydrogen, and the remaining $X^{21}$ is $R^1$; and
in the formula (4-1), at least two of the $X^{21}$ is hydrogen, and the remaining $X^{21}$ is a group defined in the same way as R in the formula (1-1).

15. The optical waveguide according to claim 9, wherein:
all of the R in the formula (1-1) are unsubstituted phenyl;
in each of the formulae (a-1) and (b-1), at least one of the $X^{11}$ is vinyl, aryl, or styryl, and the remaining $X^{11}$ is alkyl having 1 to 4 carbon atoms or unsubstituted phenyl;
in each of the formulae (a-2) and (b-2), at least one of $X^{12}$ is hydrogen, and the remaining $X^{12}$ is alkyl having 1 to 4 carbon atoms or unsubstituted phenyl;
in each of the formulae (2-1), (3-1), (5-1), and (6-1), $R^1$ is an alkyl having 1 to 4 carbon atoms or unsubstituted phenyl;
in the formula (2-1), at least two of the $X^{21}$ is hydrogen, and the remaining $X^{21}$ is $R^1$; and
in the formula (4-1), at least two of the $X^{21}$ is hydrogen, and the remaining $X^{21}$ is a group defined in the same way as R in the formula (1-1).

16. The optical waveguide according to claim 3, comprising a polymer obtained by reacting a silsesquioxane derivative represented by the formula (1-2) with a compound having at least two alkenyl-containing groups or a compound having a carbon-carbon triple bond

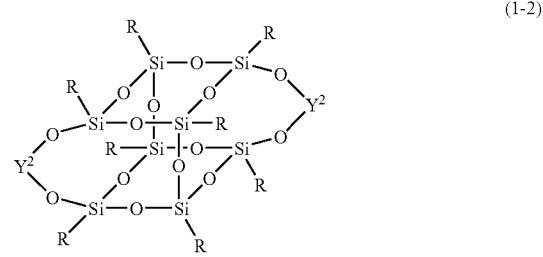

(1-2)

wherein, in the formula (1-2), R independently represents hydrogen,
alkyl having 1 to 40 carbon atoms in which hydrogen may optionally be replaced by fluorine and —CH$_2$— may optionally be replaced by —O—, —CH═CH—, cycloalkylene, or cycloalkenylene, aryl in which hydrogen may optionally be replaced by halogen, or by alkyl having 1 to 20 carbon atoms in which hydrogen may optionally be replaced by fluorine and —CH$_2$— may optionally be replaced by —O—, —CH═CH—, cycloalkylene, or phenylene, or arylalkyl in which hydrogen in the aryl may optionally be replaced by halogen or alkyl having 1 to 20 carbon atoms, and hydrogen in the alkylene of the arylalkyl may optionally be replaced by fluorine, and —CH$_2$— in the alkylene of the arylalkyl may optionally be replaced by —O—, —CH═CH—, or cycloalkylene, and Y$^2$ is a group represented by the formula (a-2) or (b-2)

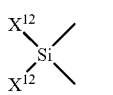

(a-2)

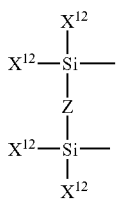

(b-2)

wherein, in each of the formulae (a-2) and (b-2), at least one of the X$^{12}$ is hydrogen, and the remaining X$^{12}$ independently represents hydrogen, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—

Z in the formula (b-2) represents a single bond, —O—, or —CH$_2$—.

17. The optical waveguide according to claim 16, comprising of a polymer obtained by reacting a silsesquioxane derivative represented by the formula (1-2) with at least one of the compounds selected from the group consisting of a compound represented by the formula (2-2), a compound represented by the formula (3-2), a compound represented by the formula (4-2), a compound represented by the formula (5-2), a compound represented by the formula (6-2), a compound represented by the formula (d-1), a compound represented by the formula (d-2), a compound represented by the formula (d-3), and a compound represented by the formula (d-4)

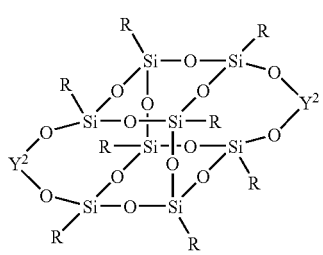

(1-2)

wherein, in the formula (1-2), R independently represents hydrogen, alkyl having 1 to 40 carbon atoms in which hydrogen may optionally be replaced by fluorine and —CH$_2$— may optionally be replaced by —O—, —CH═CH—, cycloalkylene, or cycloalkenylene, aryl in which hydrogen may optionally be replaced by halogen, or by alkyl having 1 to 20 carbon atoms in which hydrogen may optionally be replaced by fluorine and optional —CH$_2$— may be replaced by —O—, —CH═CH—, cycloalkylene, or phenylene, or arylalkyl in which hydrogen in the aryl may optionally be replaced by halogen or alkyl having 1 to 20 carbon atoms, and hydrogen in the alkylene of the arylalkyl may optionally be replaced by fluorine, and —CH$_2$— in the alkylene of the arylalkyl may optionally be replaced by —O—, —CH═CH—, or cycloalkylene, and Y$^2$ is a group represented by the formula (a-2) or (b-2)

(a-2)

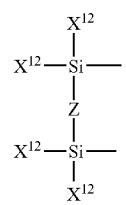

(b-2)

wherein, in each of the formulae (a-2) and (b-2), at least one of X$^{12}$ is hydrogen, and the remaining X$^{12}$ independently represents chlorine, a group defined in the same way as R, or a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and Z in the formula (b-2) represents a single bond, —O—, or —CH$_2$—

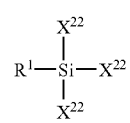

(2-2)

wherein, in the formula (2-2), R$^1$ is a group defined in the same way as R in the formula (1-2), at least two X$^{22}$ are an alkenyl-containing group or a group having a carbon-carbon triple bond, and the remaining X$^{22}$ is R$^1$

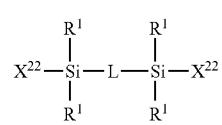

(3-2)

-continued

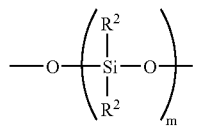 (c)

wherein, in the formula (3-2), $R^1$ is a group defined in the same way as R in the formula (1-2), $X^{22}$ is alykenyl-containing group, and L represents a single bond, —O—, —$CH_2$—, —$(CH_2)_2$—, —$(CH_2)_3$—, —$(CH_2)_4$—, 1,4-phenylene, 4,4'-diphenylene, 4,4'-oxy-1,1'-diphenylene, or a group represented by the formula (c)
wherein, in the formula (c), $R^2$ is a group defined in the same way as $R^1$, and m represents an integer of 1 to 30

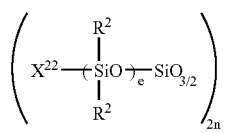 (4-2)

wherein, in the formula (4-2), $R^2$ is a group defined in the same way as $R^1$ in the formula (2-2), at least two of the $X^{22}$ is an alkenyl-containing group, the remaining $X^{22}$ is a group defined in the same way as R in the formula (1-2), e represents 0 or 1, and n represents an integer of 3 to 30

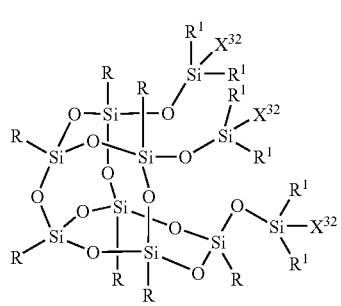 (5-2)

wherein, in the formula (5-2), each of R and $R^1$ is a group defined in the same way as R in the formula (1-2), at least two of the $X^{32}$ is an alkenyl-containing group, and the remaining $X^{32}$ is $R^1$

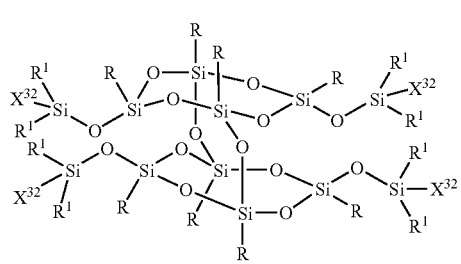 (6-2)

wherein, in the formula (6-2), each of R and $R^1$ is a group defined in the same way as R in the formula (1-2), at least two of the $X^{32}$ is an alkenyl-containing group, and the remaining $X^{32}$ is $R^1$ $H_2C=CH—R^3—CH=CH_2$ (d-1)

$HC≡C—R^3—C≡CH$ (d-2)

$R^4—C≡C—R^4$ (d-3)

$R^4—C≡C—C≡C—R^4$ (d-4)

wherein, in each of the formulae (d-1), (d-2), (d-3) and (d-4), $R^3$ represents
  alkyl having 1 to 40 carbon atoms in which —$CH_2$— may optionally be replaced by —O— or —COO—, or
  phenyl in which hydrogen may optionally be replaced by halogen or an alkyl having 1 to 4 carbon atoms,
$R^4$ represents
  an alkyl having 1 to 8 carbon atoms in which —$CH_2$— may optionally be replaced by —O— or —COO—, or
  phenyl in which hydrogen may optionally be replaced by halogen or an alkyl having 1 to 4 carbon atoms.

18. The optical waveguide according to claim 17, wherein:
  in each of the formulae (a-2) and (b-2) in the formula (1-2), at least one of $X^{12}$ is hydrogen, and the remaining $X^{12}$ is chlorine or the same group as R in the formula (1-2).

19. The optical waveguide according to claim 17, wherein:
  R in the formula (1-2) independently represents.
  alkyl having 1 to 8 carbon atoms in which hydrogen may optionally be replaced by fluorine, and —$CH_2$— may optionally be replaced by —O— or cycloalkylene,
  naphthyl,
  phenyl in which hydrogen may optionally be replaced by halogen, methyl, or methoxy, or
  phenylalkyl in which hydrogen of the benzene ring may optionally be replaced by halogen, alkyl having 1 to 4 carbon atoms, or methoxy, and alkylene in the phenylalkyl has 1 to 8 carbon atoms, and —$CH_2$— in the alkylene in the phenylalkyl may optionally be replaced by —O— or cycloalkylene;
  in each of the formulae (a-2) and (b-2), at least one of $X^{12}$ is hydrogen, and the remaining $X^{12}$ is a group defined in the same way as R in the formula (1-2); and
  Z in the formula (b-2) represents —O—.

20. The optical waveguide according to claim 17, wherein:
  all of the R in the formula (1-2) are the same group selected from
  alkyl having 1 to 8 carbon atoms in which hydrogen may optionally be replaced by fluorine, and —$CH_2$— may optionally be replaced by —O— or cycloalkylene,
  naphthyl,
  phenyl in which hydrogen may optionally be replaced by halogen, methyl, or methoxy, or
  phenylalkyl in which hydrogen of the benzene ring may optionally be replaced by halogen, an alkyl group having 1 to 4 carbon atoms, or methoxy, and alkylene in the phenylalkyl has 1 to 8 carbon atoms, and —$CH_2$— in the alkylene in the phenylalkyl may optionally be replaced by —O— or a cycloalkylene;
  in each of the formulae (a-2) and (b-2), at least one of $X^{12}$ is hydrogen, and the remaining $X^{12}$ is a group defined in the same way as R in the formula (1-2); and
  Z in the formula (b-2) represents —O—.

21. The optical waveguide according to claim 17, wherein:

all of the R in the formula (1-2) are the same group selected from unsubstituted phenyl, cyclopentyl, and cyclohexyl;

in each of the formulae (a-2) and (b-2), at least one of $X^{12}$ is hydrogen, and the remaining $X^{12}$ is an alkyl having 1 to 8 carbon atoms, or unsubstituted phenyl, cyclopentyl, or cyclohexyl;

Z in the formula (b-2) represents —O—; and in each of the formulae (2-2), (3-2), (5-2), and (6-2), $R^1$ is an alkyl having 1 to 8 carbon atoms, or unsubstituted phenyl, cyclopentyl, or cyclohexyl.

22. The optical waveguide according to claim 17, wherein:

all of the R in the formula (1-2) are the same group selected from unsubstituted phenyl, cyclopentyl, and cyclohexyl;

in each of the formulae (a-2) and (b-2), at least one of $X^{12}$ is hydrogen, and the remaining $X^{12}$ is an alkyl having 1 to 8 carbon atoms, or unsubstituted phenyl, cyclopentyl, or cyclohexyl;

Z in the formula (b-2) represents —O—;

in each of the formulae (2-2), (3-2), (5-2), and (6-2), $R^1$ is an alkyl having 1 to 8 carbon atoms, or unsubstituted phenyl, cyclopentyl, or cyclohexyl;

in the formula (2-2), at least two $X^{22}$ are vinyl, aryl or styryl, and the remaining $X^{22}$ is $R^1$;

in the formula (3-2), $X^{22}$ is vinyl, aryl or styryl;

in the formula (4-2), at least two $X^{22}$ are vinyl, aryl or styryl, and the remaining $X^{22}$ is a group defined in the same way as R in the formula (1-2); and in each of the formulae (5-2) and (6-2), at least two of the $X^{32}$ are vinyl, aryl or styryl, and the remaining $X^{32}$ is $R^1$.

23. The optical waveguide according to claim 17, wherein:

all of the R in the formula (1-2) are unsubstituted phenyl;

in each of the formulae (a-2) and (b-2), at least one of $X^{12}$ is hydrogen, and the remaining $X^{12}$ is an alkyl having 1 to 4 carbon atoms or unsubstituted phenyl;

Z in the formula (b-2) represents —O—;

in each of the formulae (2-2), (3-2), (5-2), and (6-2), $R^1$ is an alkyl having 1 to 4 carbon atoms or unsubstituted phenyl;

in the formula (2-2), at least two $X^{22}$ are a vinyl, allyl, or styryl, and the remaining $X^{22}$ is $R^1$;

in the formula (3-2), $X^{22}$ is a vinyl, allyl, or styryl;

in the formula (4-2), at least two $X^{22}$ are a vinyl, allyl, or styryl, and the remaining $X^{22}$ is an unsubstituted phenyl; and in each of the formulae (5-2) and (6-2), at least two of the $X^{32}$ are a vinyl, allyl, or styryl, and the remaining $X^{32}$ is $R^1$.

24. The optical waveguide according to claim 3, comprising a polymer obtained by reacting a silsesquioxane derivative represented by the formula (1-4) with a compound having at least two groups capable of reacting with the reactive group in the silsesquioxane derivative

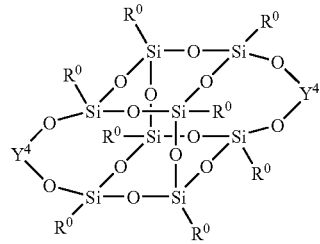

(1-4)

wherein, in the formula (1-4), $R^0$ independently represents hydrogen, alkyl having 1 to 40 carbon atoms in which hydrogen may optionally be replaced by fluorine and —CH$_2$— may optionally be replaced by —O—, —CH═CH—, cycloalkylene, or cycloalkenylene, aryl in which hydrogen may optionally be replaced by halogen, or with alkyl having 1 to 20 carbon atoms in which hydrogen may optionally be replaced by fluorine and —CH$_2$— may optionally be replaced by —O—, —CH═CH—, cycloalkylene, or phenylene, or arylalkyl in which hydrogen in the aryl may optionally be replaced by halogen or alkyl having 1 to 20 carbon atoms, and hydrogen in the alkylene of the arylalkyl may optionally be replaced by fluorine, and —CH$_2$— in the alkylene of the arylalkyl may optionally be replaced by —O—, —CH═CH—, or cycloalkylene, and $Y^4$ is a group represented by the formula (a-4) or (b-4)

(a-4)

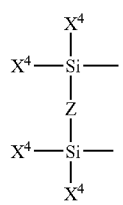

(b-4)

wherein, in each of the formulae (a-4) and (b-4), $X^4$ independently represents a chlorine, a group defined in the way as $R^0$, or a group having any one of —CH═CH—, —C≡C—, —OH, —COOH, —COO—, 2-oxapropane-1,3-dioyl, oxilanyl, oxilanylene, oxetanyl, oxetanylene, 3,4-epoxycyclohexyl, —SH, —NH—, —NH$_2$, —CN, and —O—, and at least one of the $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —NH$_2$, and Z in the formula (b-4) represents a single bond, —O—, or —CH$_2$—.

25. The optical waveguide according to claim 24, wherein:

in the formula (1-4), $R^0$ independently represents alkyl having 1 to 8 carbon atoms in which hydrogen may be replaced by fluorine, and —CH$_2$— may optionally be replaced by —O— or a cycloalkylene, naphthyl, phenyl in which hydrogen may optionally be replaced by halogen, methyl, or methoxy, or phenylalkyl in which hydrogen of the benzene ring may optionally be replaced by halogen, an alkyl having 1 to 4 carbon atoms, or methoxy, and alkylene in the phenylalkyl has 1 to 8 carbon atoms, and —$CH_2$— in the alkylene in the phenylalkyl may optionally be replaced by —O— or cycloalkylene;

in each of the formulae (a-4) and (b-4), at least one of $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and Z in the formula (b-4) represents —O—.

26. The optical waveguide according to claim 24, wherein:

in the formula (1-4), all of the $R^0$ are the same group selected from alkyl having 1 to 8 carbon atoms in which hydrogen may optionally be replaced by fluorine, and —$CH_2$— may optionally be replaced by —O— or cycloalkylene, naphthyl, phenyl in which hydrogen may optionally be replaced by halogen, methyl, or methoxy, and phenylalkyl in which hydrogen of the benzene ring may optionally be replaced by halogen, an alkyl having 1 to 4 carbon atoms or methoxy, and alkylene in the phenylalkyl has 1 to 8 carbon atoms, and —$CH_2$— in the alkylene in the phenylalkyl may optionally be replaced by —O— or cycloalkylene;

in each of the formulae (a-4) and (b-4), at least one of $X^4$ is a reactive group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and Z in the formula (b-4) represents —O—.

27. The optical waveguide according to claim 24, wherein:

all of the $R^0$ are the same group selected from unsubstituted phenyl, cyclopentyl, and cyclohexyl;

in each of the formulae (a-4) and (b-4), one of $X^4$ is a group selected from chlorine bound to Si, and a group having any one of —OH, —COOH, —COO—, 2-oxapropane-1,3-dioyl, oxilanyl, oxilanylene, oxetanyl, oxetanylene, 3,4-epoxycyclohexyl, —SH, —NH—, and —$NH_2$, and the remaining $X^4$ is a group defined in the same way as $R^0$ in the formula (1-4); and Z in the formula (b-4) represents —O—.

28. The optical waveguide according to claim 24, comprising a polymer obtained by reacting a silsesquioxane derivative represented by the formula (1-4) in which $Y^4$ is a group represented by the formula (a-2) with a compound represented by the formula (8-2)

(a-2)

$X^{12}$ in the formula (a-2) is an alkyl having 1 to 4 carbon atoms or unsubstituted phenyl

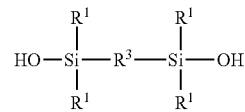
(8-2)

wherein, in the formula (8-2), $R^1$ is an alkyl having 1 to 4 carbon atoms or unsubstituted phenyl, and $R^3$ is a phenyl, naphthalene, or anthracene.

29. The optical waveguide according to claim 24, comprising a polymer obtained by reacting a silsesquioxane derivative represented by the formula (1-4) in which $Y^4$ is a group represented by the formula (a-3) with a carboxylic acid or an epoxy

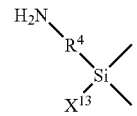
(a-3)

wherein, in the formula (a-3), $R^4$ is a divalent organic group having 1 to 20 carbon atoms, and $X^{13}$ is an alkyl having 1 to 4 carbon atoms or an unsubstituted phenyl.

30. The optical waveguide according to claim 24, comprising a polymer obtained by reacting a silsesquioxane derivative represented by the formula (1-4) in which $Y^4$ is a group represented by the formula (a-4) with diamine

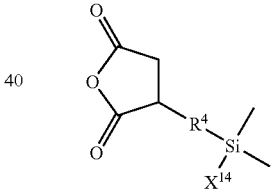
(a-4)

wherein, in the formula (a-4), $R^4$ is a divalent organic group having 1 to 20 carbon atoms, and $X^{14}$ is an alkyl having 1 to 4 carbon atoms or unsubstituted phenyl.

31. The optical waveguide according to claim 24, comprising a polymer obtained by reacting a silsesquioxane derivative represented by the formula (1-4) in which $Y^4$ is a group represented by the formula (a-3) with a silsesquioxane derivative represented by the formula (1-4) in which $Y^4$ is a group represented by the formula (a-4)

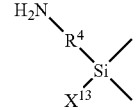
(a-3)

wherein, in the formula (a-3), $R^4$ is a divalent organic group having 1 to 20 carbon atoms, and $X^{13}$ is an alkyl having 1 to 4 carbon atoms or unsubstituted phenyl

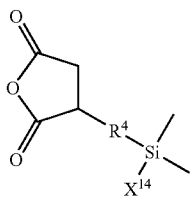

(a-4)

wherein, in the formula (a-4), $R^4$ is a divalent organic group having 1 to 20 carbon atoms, and $X^{14}$ is an alkyl having 1 to 4 carbon atoms or unsubstituted phenyl.

32. The optical waveguide according to claim 24, comprising a polymer obtained by reacting a silsesquioxane derivative represented by the formula (1-4) in which $Y^4$ is a group represented by the formula (a-4) with a silsesquioxane derivative represented by the formula (1-4) in which $Y^4$ is a group represented by the formula (a-5)

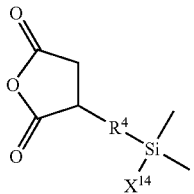

(a-4)

wherein, in the formula (a-4), $R^4$ is a divalent organic group having 1 to 20 carbon atoms, and $X^{14}$ is an alkyl having 1 to 4 carbon atoms or unsubstituted phenyl

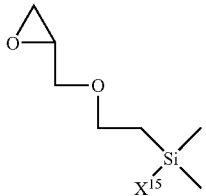

(a-5)

$X^{15}$ in the formula (a-5) is an alkyl having 1 to 4 carbon atoms or unsubstituted phenyl.

33. The optical waveguide according to claim 24, comprising a polymer obtained by reacting a silsesquioxane derivative represented by the formula (1-4) in which $Y^4$ is a group represented by the formula (a-4) with a compound represented by the formula (9-1)

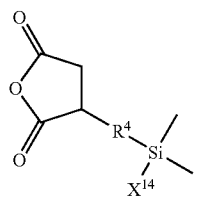

(a-4)

wherein, in the formula (a-4), $R^4$ is a divalent organic group having 1 to 20 carbon atoms, and $X^{14}$ is an alkyl having 1 to 4 carbon atoms or unsubstituted phenyl

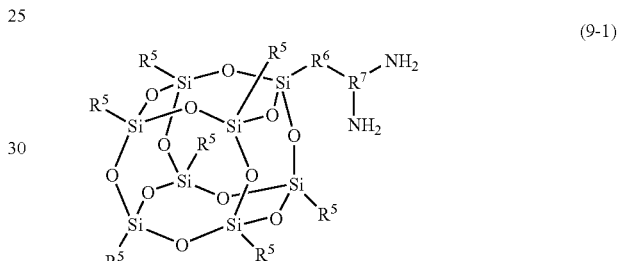

(9-1)

wherein, in the formula (9-1), all of the $R^5$ are alkyl having 1 to 20 carbon atoms, alkenyl having 2 to 20 carbon atoms, or aryl having 6 to 20 carbon atoms, in which —$CH_2$— may optionally be replaced by —O—, and optional hydrogen may be replaced by halogen $R^6$ is a single bond or a divalent organic group having 1 to 15 carbon atoms, and $R^7$ is a trivalent organic group having 1 to 15 carbon atoms.

* * * * *